US012112615B2

(12) United States Patent
Gajurel et al.

(10) Patent No.: US 12,112,615 B2
(45) Date of Patent: Oct. 8, 2024

(54) IDENTIFICATION OF LOAD CONTROL DEVICES

(71) Applicant: Lutron Technology Company LLC, Coopersburg, PA (US)

(72) Inventors: Rupesh Gajurel, Hellertown, PA (US); Sandeep Mudabail Raghuram, Emmaus, PA (US); Rhodes B. Baker, Bethlehem, PA (US); Brian Michael Courtney, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 491 days.

(21) Appl. No.: 17/466,893

(22) Filed: Sep. 3, 2021

(65) Prior Publication Data

US 2021/0398401 A1 Dec. 23, 2021

Related U.S. Application Data

(63) Continuation of application No. 16/154,272, filed on Oct. 8, 2018, now Pat. No. 11,116,063, which is a (Continued)

(51) Int. Cl.
*G08B 5/38* (2006.01)
*H05B 47/165* (2020.01)
(Continued)

(52) U.S. Cl.
CPC ............ *G08B 5/38* (2013.01); *H05B 47/165* (2020.01); *H05B 47/19* (2020.01); *H05B 47/18* (2020.01)

(58) Field of Classification Search
None
See application file for complete search history.

(56) References Cited

U.S. PATENT DOCUMENTS

| | | |
|---|---|---|
| 5,488,571 A | 1/1996 | Jacobs et al. |
| 5,838,116 A | 11/1998 | Katyl et al. |

(Continued)

FOREIGN PATENT DOCUMENTS

| | | |
|---|---|---|
| WO | WO2003007665 A1 | 1/2003 |
| WO | WO2010146519 A1 | 12/2010 |
| WO | WO2011051865 A1 | 5/2011 |

OTHER PUBLICATIONS

Lutron, "Energi Savr Node—Handheld Programming Guide", Lutron Electronics Co., Inc., 2012, 96 pages.

*Primary Examiner* — Alpus Hsu
*Assistant Examiner* — Camquyen Thai
(74) *Attorney, Agent, or Firm* — Michael S. Czarnecki; Glen R. Farbanish; Philip N. Smith

(57) ABSTRACT

A load control system may include a load control device for providing power to an electrical load and a control device that may send instructions to the load control device for providing the power to the electrical load. The control device may communicate with the load control device using a link address assigned to the load control device. The load control device may provide power to the electrical load in a manner that causes the electrical load to indicate the link address assigned to the load control device. The link address may be identified by a user or a user device. The identified link address may be associated with a load control device identifier that may identify a physical location of a load control device that is assigned the link address. A user may control a load control device at a physical location by sending instructions via the link address.

25 Claims, 20 Drawing Sheets

Related U.S. Application Data continuation of application No. 15/424,161, filed on Feb. 3, 2017, now Pat. No. 10,098,208, which is a continuation of application No. 13/796,877, filed on Mar. 12, 2013, now Pat. No. 9,585,226.

(51) Int. Cl.
*H05B 47/18* (2020.01)
*H05B 47/19* (2020.01)

(56) References Cited

U.S. PATENT DOCUMENTS

| | | | | |
|---|---|---|---|---|
| 6,400,482 | B1 | 6/2002 | Lupton et al. | |
| 6,794,831 | B2 | 9/2004 | Leeb et al. | |
| 6,954,591 | B2 | 10/2005 | Lupton et al. | |
| 6,983,783 | B2 | 1/2006 | Carmen, Jr. et al. | |
| 7,016,115 | B1 | 3/2006 | Leeb et al. | |
| 7,307,542 | B1 | 12/2007 | Chandler et al. | |
| 7,391,297 | B2 | 6/2008 | Cash et al. | |
| 7,548,150 | B2 | 6/2009 | Huber et al. | |
| 7,619,539 | B2 | 11/2009 | Veskovic et al. | |
| 7,764,162 | B2 | 7/2010 | Cash et al. | |
| 7,889,051 | B1 | 2/2011 | Billig et al. | |
| 8,035,529 | B2 | 10/2011 | Veskovic et al. | |
| 8,228,163 | B2 | 7/2012 | Cash et al. | |
| 8,587,225 | B2 | 11/2013 | Ashar et al. | |
| 8,838,282 | B1 | 9/2014 | Ratliff et al. | |
| 9,585,226 | B2 | 2/2017 | Gajurel et al. | |
| 10,098,208 | B2 | 10/2018 | Gajurel et al. | |
| 2002/0154025 | A1 | 10/2002 | Ling | |
| 2004/0217718 | A1* | 11/2004 | Kumar | H05B 47/195 315/291 |
| 2005/0128666 | A1 | 6/2005 | Pogodayev et al. | |
| 2006/0109203 | A1 | 5/2006 | Huber et al. | |
| 2006/0208661 | A1 | 9/2006 | Mogilner et al. | |
| 2007/0297607 | A1 | 12/2007 | Ogura et al. | |
| 2008/0068126 | A1 | 3/2008 | Johnson et al. | |
| 2008/0191837 | A1 | 8/2008 | Stocker | |
| 2008/0266080 | A1 | 10/2008 | Leung et al. | |
| 2008/0303688 | A1 | 12/2008 | Newman, Jr. | |
| 2008/0315791 | A1* | 12/2008 | Melanson | H05B 35/00 362/228 |
| 2009/0022306 | A1 | 1/2009 | Wang et al. | |
| 2009/0080896 | A1 | 3/2009 | Pereira et al. | |
| 2009/0091467 | A1* | 4/2009 | Ries, II | H05B 47/29 340/815.45 |
| 2009/0273433 | A1 | 11/2009 | Rigatti et al. | |
| 2010/0238001 | A1 | 9/2010 | Veskovic | |
| 2010/0241255 | A1 | 9/2010 | Benetz et al. | |
| 2010/0259193 | A1* | 10/2010 | Umezawa | H05B 47/19 315/297 |
| 2011/0140864 | A1 | 6/2011 | Bucci | |
| 2011/0141472 | A1 | 6/2011 | Meijer et al. | |
| 2011/0169413 | A1 | 7/2011 | Wendt et al. | |
| 2011/0222849 | A1* | 9/2011 | Han | H04B 10/116 398/25 |
| 2012/0001567 | A1* | 1/2012 | Knapp | H04L 12/6418 315/291 |
| 2012/0133315 | A1 | 5/2012 | Berman et al. | |
| 2012/0212140 | A1* | 8/2012 | Kim | H05B 45/30 315/291 |
| 2012/0286672 | A1 | 11/2012 | Holland et al. | |
| 2012/0299509 | A1 | 11/2012 | Lee et al. | |
| 2012/0306621 | A1 | 12/2012 | Muthu | |
| 2012/0328302 | A1 | 12/2012 | Iizuka et al. | |
| 2013/0158952 | A1* | 6/2013 | Liebel | G06F 15/00 702/182 |
| 2013/0181630 | A1* | 7/2013 | Taipale | H05B 45/10 315/210 |
| 2013/0221872 | A1 | 8/2013 | Gan et al. | |

* cited by examiner

| Ballast ID | Link Address |
|---|---|
| B1 | Addr9 |
| B2 | Addr2 |
| B3 | Addr15 |
| B4 | Addr11 |
| B5 | Addr7 |
| B6 | Addr13 |
| B7 | Addr21 |
| B8 | Addr23 |
| B9 | Addr27 |
| B10 | Addr18 |
| B11 | Addr17 |
| B12 | Addr1 |
| B13 | Addr25 |
| B14 | Addr19 |
| B15 | Addr26 |
| B16 | Addr24 |
| B17 | Addr6 |
| B18 | Addr4 |
| B19 | Addr22 |
| B20 | Addr12 |
| B21 | Addr20 |
| B22 | Addr8 |
| B23 | Addr16 |
| B24 | Addr14 |
| B25 | Addr10 |
| B26 | Addr3 |
| B27 | Addr5 |

IDENTIFICATION OF LOAD CONTROL DEVICES

CROSS-REFERENCE TO RELATED APPLICATIONS

This application is a continuation of U.S. patent application Ser. No. 16/154,272, filed Oct. 8, 2018, which is a continuation of U.S. patent application Ser. No. 15/424,161, filed Feb. 3, 2017 (now U.S. Pat. No. 10,098,208, issued Oct. 9, 2018); which is a continuation of U.S. patent application Ser. No. 13/796,877, filed Mar. 12, 2013 (now U.S. Pat. No. 9,585,226, issued Feb. 28, 2017), each of which is hereby incorporated by reference herein in its entirety.

BACKGROUND

Lighting systems may include a lighting load, an electrical ballast for controlling electrical power to the lighting load, and/or a ballast control device capable of sending instructions to the ballast for controlling the electrical power provided to the lighting load. Typically, after the lighting system is installed in a location, such as a residence, an office, or the like, the ballast control device may assign a link address to each ballast that it controls. The link address may be used for sending instructions to the ballast. This assignment may be done at random. For example, a ballast control device may be capable of controlling 64 ballasts and may randomly assign each ballast a link address (e.g., 1-64).

However, it is difficult to determine what ballast address was assigned to a ballast at a specific location. For example, a floor plan may indicate each ballast and its corresponding location in a room or building, and the ballast control device may have a list of the assigned link addresses. However, the installer, at the location of a particular ballast, cannot readily identify that particular ballast's address. Similarly, the installer, with a particular link address, cannot readily identify the corresponding location of the ballast with that link address.

FIG. 1 shows a prior art example used for determining a link address assigned to a ballast in a lighting system. As shown in FIG. 1, each of rooms 102, 104, and 106 may be in the same building and may be installed with one or more lighting loads. Rooms 102 and 104 may be on the same floor of the building, while rooms 102 and 106 may be on different floors. Each lighting load may be controlled via a ballast. Each ballast may be randomly assigned a unique identifier by the ballast control device 112 for sending instructions to the ballast for controlling the lighting load.

To determine the link address associated with each of the ballasts, a user 116 may select a link address that the user 116 wishes to identify at the computer 114 and the computer 114 may send instructions to the ballast to instruct the ballast that has been assigned the link address to flash its lighting load for identification. For example, the user 116 may select a unique identifier that has been assigned to ballast 110 and may send instructions which may cause the lighting load 108 that is controlled by ballast 110 to flash on and off.

As the ballast control device 112 may be capable of controlling up to at least 64 ballasts, and the ballast 110 may be installed in multiple rooms throughout a building, the user 116 may instruct the ballast 110 to identify itself via the lighting load 108, while user 118 searches multiple rooms (e.g., rooms 102, 104, and/or 108) throughout the building to find the flashing lighting load 108. Once the lighting load 108 is identified, the user 118 may communicate the ballast identity of the ballast 110 to the user 116 and the user 116 may associate the ballast identity (e.g., indicating the ballast location) with the selected link address. This association may be stored in the computer 114 such that the user 116 can properly identify the ballast 110 and configure the lighting system by sending instructions to the ballast 110 using the link address assigned to the ballast 110.

FIG. 2A depicts example prior art floor plan displays 202, 204, and 206 that may be used to identify the installed ballasts. The floor plan displays 202, 204, and 206 may be displayed on the computer 114 and/or may illustrate the layout of the ballasts in rooms 102, 104, and 106, respectively. A user 116 may instruct the ballast assigned a first link address Addr1 to identify itself. Using the floor plan displays 202, 204, and 206, the user 118 may identify the ballast 110 as corresponding to ballast B9 in the floor plan display 202. Once the ballast 110 is identified, the user 118 may communicate the identified ballast to user 116 and user 116 may associate the ballast 110 with link address Addr1 in an association table, such as the association table 210 shown in FIG. 2B for example. The association table 210 may then be used for looking up the link address associated with the ballast 110 when the lighting system is being configured.

As shown in FIG. 2B, the association table 210 may be included in a graphical user interface (GUI) 208 that may be displayed on the computer 114 and used to associate the installed ballasts with their link addresses. After the user 116 completes the association of the ballast 110 with its link address, the user 116 can flash the lighting load of the ballast associated with the next link address by selecting the button 212. The users 116 and 118 may perform the same process described above for each ballast in the lighting system. This process of address assignment may be time consuming and costly, particularly when the lighting system is installed in a large building having many different rooms controlled by one or more ballast control devices. In fact, this form of address identification may account for about 20% of a company's post-installation commissioning costs.

SUMMARY

As described herein, a load control system may include a load control device for providing an amount of power to an electrical load and a control device that may send instructions to the load control device for providing the amount of power to the electrical load. The load control device may be assigned a link address for receiving instructions to provide the amount of power to the electrical load. To identify the link address assigned to a load control device, the load control device may provide the amount of power to the electrical load in a manner that causes the electrical load to indicate the link address assigned to the load control device.

In one example, the load control device may include an electrical ballast for controlling a lighting load. The electrical ballast may increase or decrease an amount of power provided to the lighting load in a manner that indicates the link address assigned to the electrical ballast. The electrical ballast may indicate the link address assigned to the electrical ballast based on commands or instructions received from a ballast control device, a user device, or any other device capable of communicating with the electrical ballast.

The link address may be indicated by the electrical load such that it may be identified by a user or a device. For example a user device may generate a video recording or live video stream that includes the indication of the link address provided by the electrical load. The user device may detect the electrical load in the video and/or identify the link address indicated by the electrical load. In another example, the user device may send the video to another device in the system for electrical load detection and/or link address identification.

Once the link address is identified, it may be associated with a load control device identifier. The load control device identifier may indicate a physical location of the load control device. After association, the load control device identifier may identify a load control device to which a user may send instructions using the associated link address for controlling an amount of power provided to an electrical load.

The link address of multiple load control devices may be indicated and/or identified at the same time. For example, a control device may control multiple load control devices and may instruct each load control device to provide an amount of power to a respective electrical load in a manner that indicates its link address. Each of the load control devices may indicate their link address over the same period of time.

DETAILED DESCRIPTION

Figure 1:
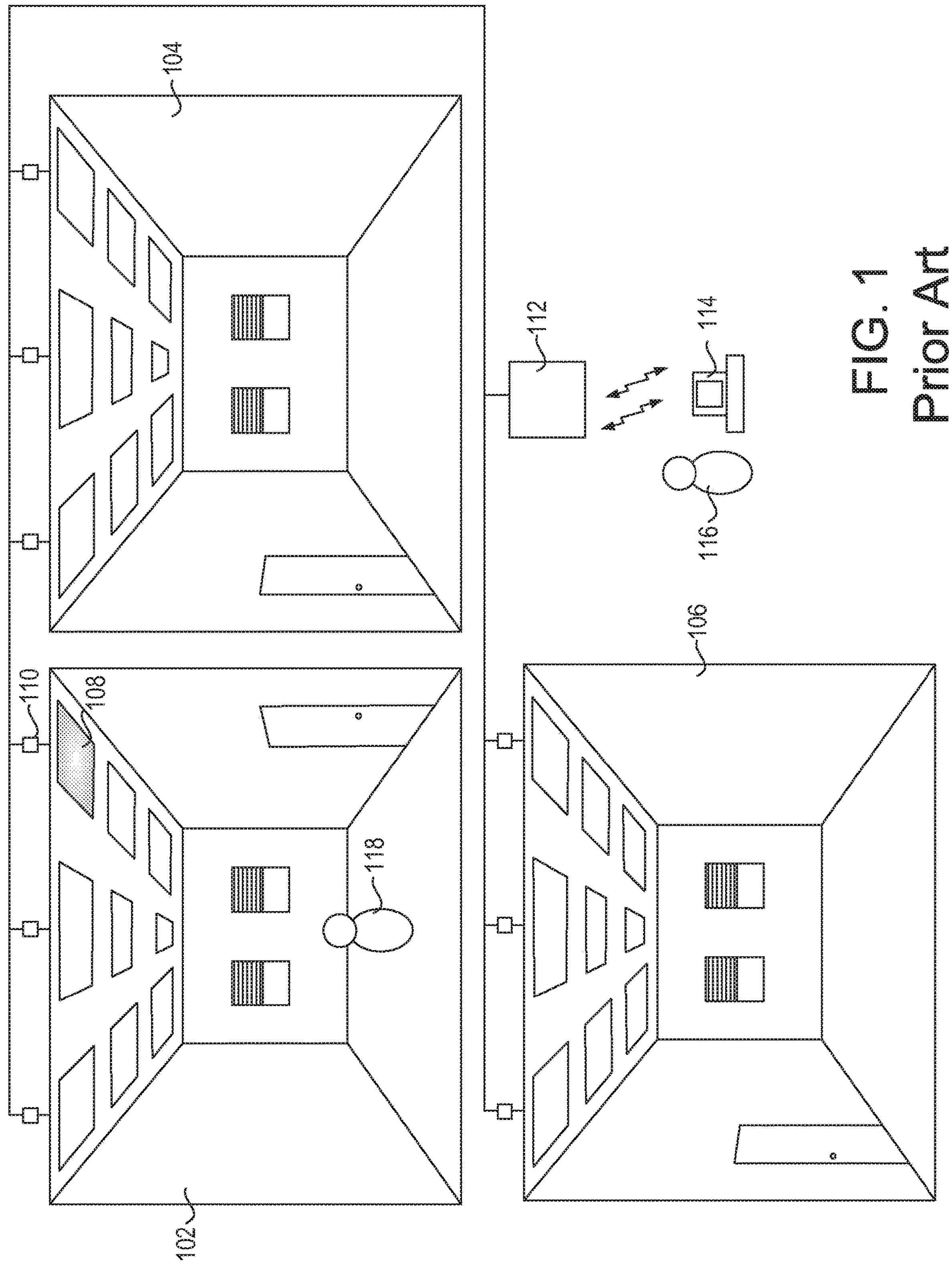
FIG. 1 Prior Art
FIG. 1 depicts an example prior art environment for locating a load control device.
Figure 2A:
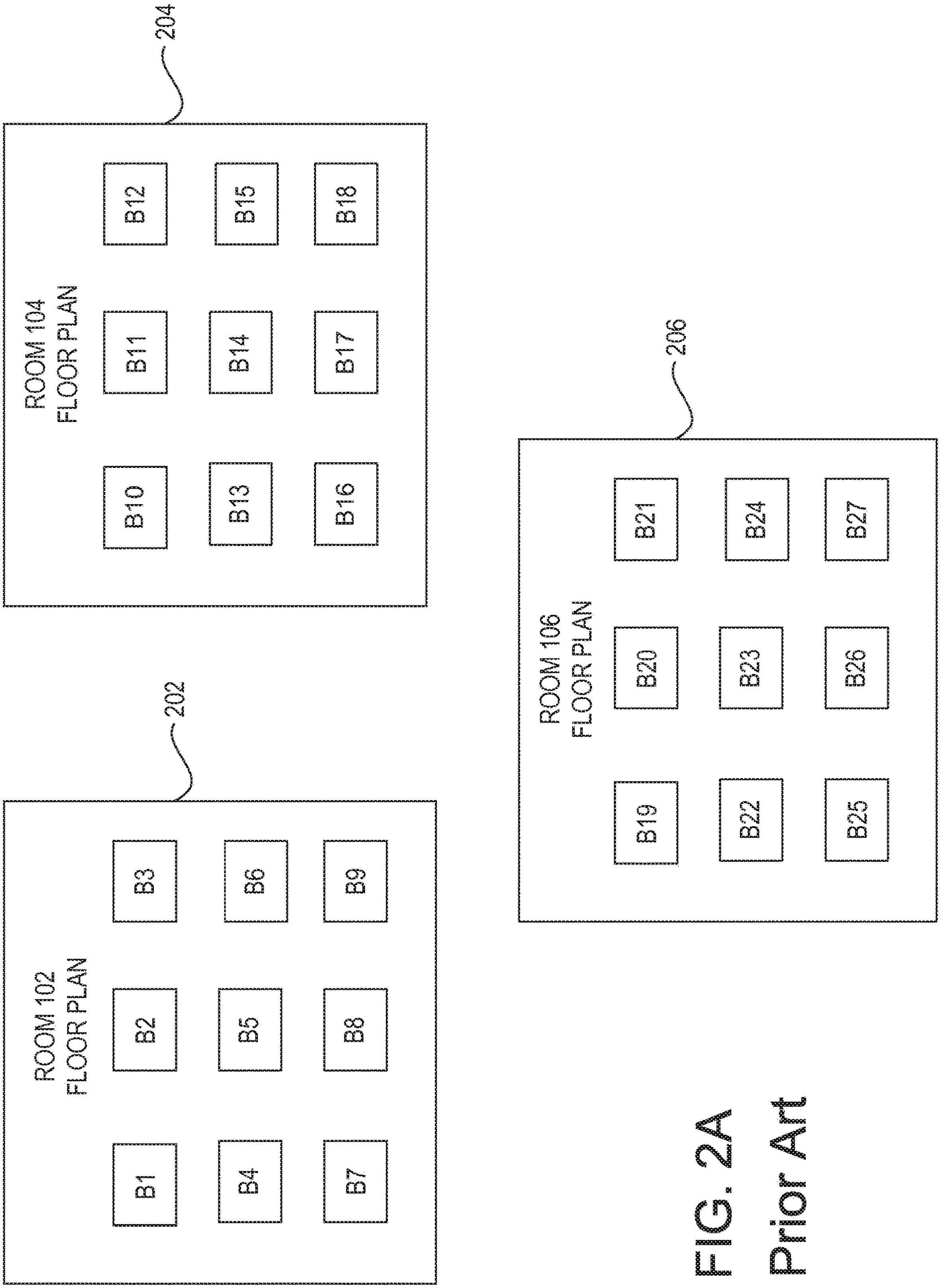
FIG. 2A Prior Art
FIG. 2A depicts prior art floor plans for identifying the physical location of a load control device.
Figure 2B:
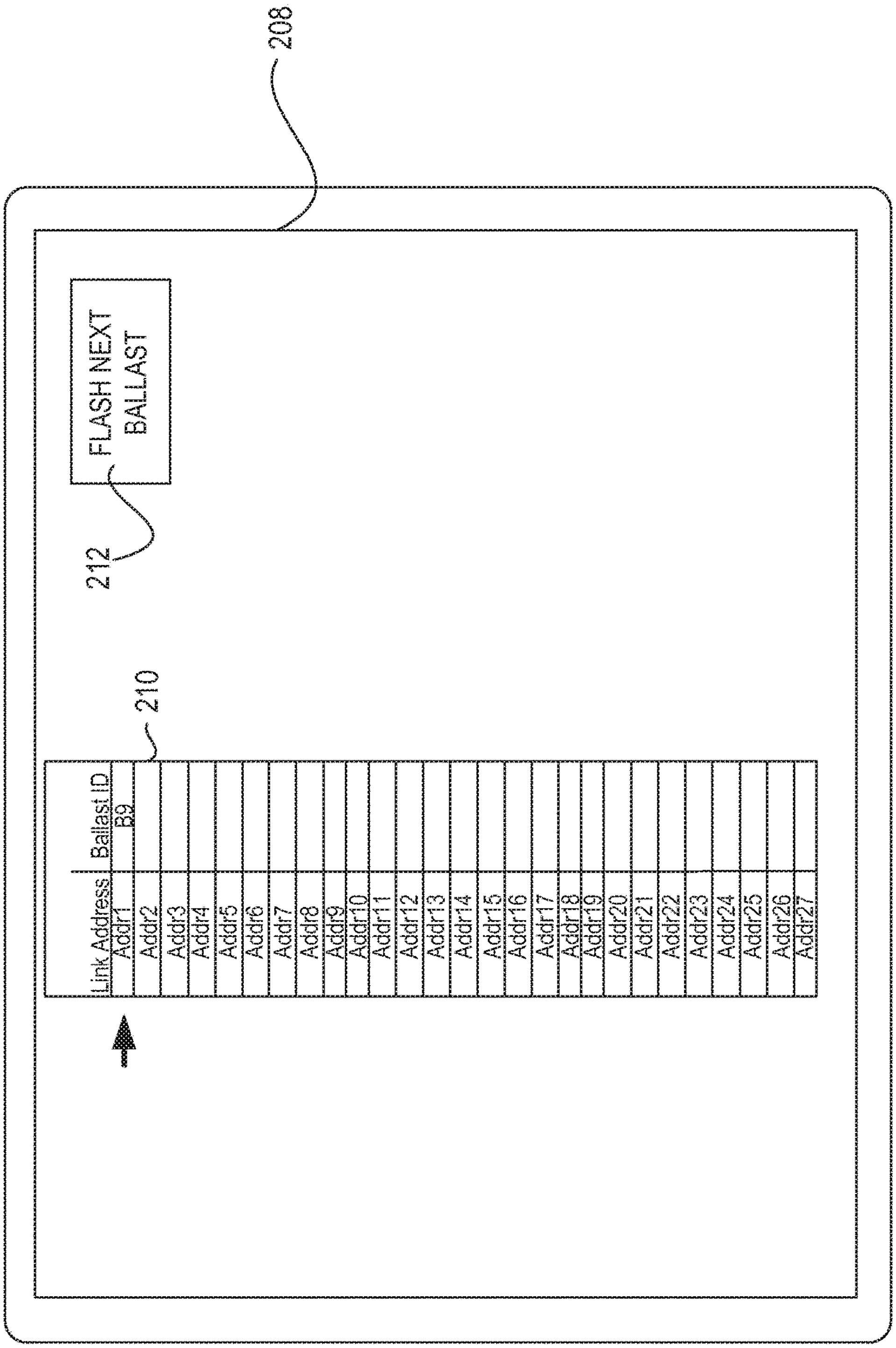
FIG. 2B Prior Art
FIG. 2B depicts a prior art graphical user interface (GUI) that may be used for association of a link address of a load control device with a physical identifier of the load control device.
Figure 3:
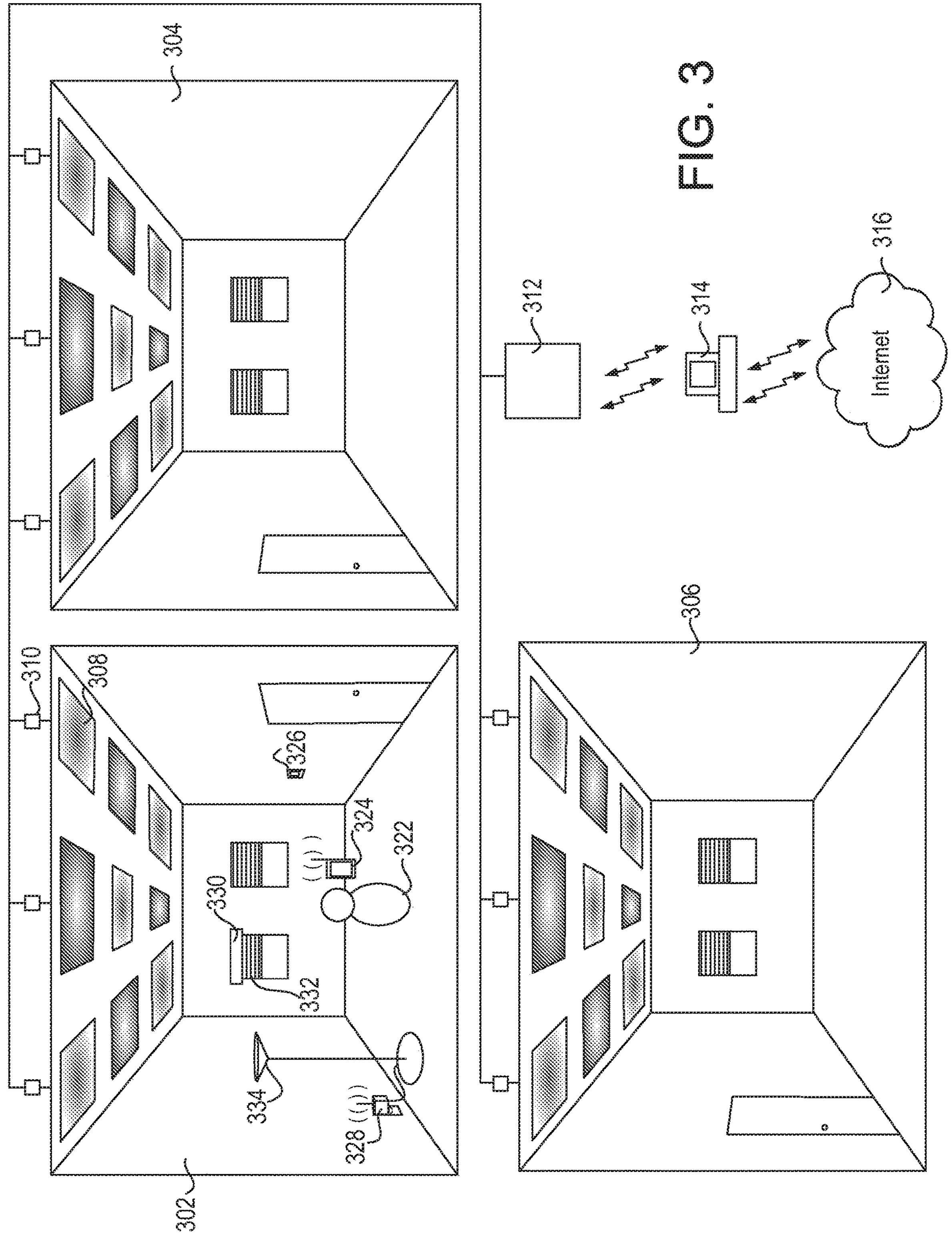
FIG. 3 is a perspective view of a representative environment for identifying a load control device.

FIG. 3 depicts a representative environment for identifying a ballast or other load control device. As shown in FIG. 3, each of rooms 302, 304, and 306 may be in the same building and may be installed with one or more lighting fixtures. Rooms 302 and 304 may be on the same floor. Room 306 may be on a different floor than rooms 302 and 304. Each lighting fixture may include one or more lighting loads (e.g., fluorescent lamps) and one or more load control devices (e.g., an electronic ballast) that are in communication with a control device (e.g., a ballast control device 312). The communications between the ballast control device 312 and the ballasts may be wired or wireless communications. The Digital Addressable Lighting Interface (DALI) may be an example protocol used for wired communications between ballasts. The ballast control device 312 may assign a link address to each of the ballasts, or group of ballasts, in which it may be in communication for controlling the amount of power provided to the lighting loads of the corresponding lighting fixture. For example, ballast 310 may be assigned a link address by ballast control device 312 for controlling the lighting loads of the lighting fixture 308. The link address may be stored at the ballast 310 and may be used by the ballast 310 to identify the instructions received from the ballast control device 312 to which to respond. In another example, the lighting fixtures may each comprise a light-emitting diode (LED) driver for controlling an LED light source, a dimming circuit for controlling a dimmable lighting load, such as an incandescent lamp, or a load control device for controlling a different type of lighting load.

As the link address may be randomly assigned to each ballast (e.g., after installation), a user 322 may have difficulty recognizing and/or controlling each ballast based on its corresponding link address. Each ballast may also be assigned a ballast identifier (e.g., after installation) that may identify the physical location of each ballast to the user 322. For example, the ballast identifier may be included on a floor plan or other means that may enable the user 322 to recognize the physical location of a ballast or group of ballasts. As the user 322 may know the ballast identifier associated with each ballast, but may be unaware of the link address for communicating instructions to the ballast, the user 322 may operate to associate each ballast identifier with the link address assigned to the ballast.

As shown in FIG. 3, the user 322 may know the ballast identifier of ballast 310 and may want to associate the ballast 310 with the link address assigned to ballast 310 by the ballast control device 312. To determine the link address assigned to the ballast 310, the ballast control device 312 may instruct the ballasts in rooms 302, 304, and 306, or a subset thereof, to identify the link address assigned thereto. For example, the ballast control device 312 may instruct the ballasts to reveal themselves by flashing a corresponding lighting load of a lighting fixture in a manner that indicates the link address. The flashes may be performed at a rate identifiable by the human eye or a camera. For example, the flashes may occur at a rate between about 24 frames per second and about 30 frames per second.

The ballast 310 may be included in the group of one or more ballasts instructed to identify their link address. As such, the ballast 310 may use the associated lighting load of the lighting fixture 308 to identify the link address assigned to ballast 310 by flashing the lighting load of the lighting fixture 308 in a manner that identifies the link address. The ballast 310 may flash the lighting load of the lighting fixture 308 by increasing and decreasing an amount of power provided to the lighting fixture 308, such that the link address is exposed by flashing the lighting load of the lighting fixture 308. For example, the ballast 310 may turn the lighting load of the lighting fixture 308 on and off, increasing and decreasing the dimming level of the lighting load, or some combination thereof. The user 322 may identify the link address provided by the ballast 310 (e.g., by visually identifying the link address) and may associate the link address with the ballast identifier assigned to ballast 310. The association may be performed via user device 324 (e.g., a mobile device, a cellular phone, a tablet, a wireless load control device, a photosensor, etc.), ballast control device 312, and/or computer 314. If the association is performed at the user device 324, the association may be sent to the computer 314 and/or ballast control device 312 for storage.

The ballast control device 312 may send the identification instructions to the ballast 310 upon receiving a trigger from user 322. For example, the user 322 may select a button on the user device 324 that causes the user device 324 to send a message to ballast control device 312 to trigger transmission of the identification instructions. The user device 324 may communicate with the ballast control device 312 directly via a short range wireless interface (e.g., WI-FI®, BLUETOOTH®, etc.) and/or indirectly via computer 314 and the internet 316 (e.g., using a WI-FI® network, a cellular network, a WI-MAX® network, etc.). The computer 314 may forward communications received from the user device 324 to the ballast control device 312 using a wired or wireless communication.

In another example, the identification instructions may be sent to each ballast directly from the user device 324. For example, the user device 324 may send the identification instructions via a broadcast message that may cause any ballast that receives the instructions to identify its link address. The broadcast message may be sent via any short range wireless channel (e.g., WI-FI®, BLUETOOTH®, etc.), for example.

Ballast 310 may be included in a group of ballasts that are instructed to flash their respective lighting load at the same time. The group of ballasts may include the ballasts in the room 302, a portion of the room 302, the floor on which room 302 resides, which may include room 304, a section of floors that includes room 302, which may include room 304 and room 306, or any other group of ballasts. The ballast 310 may be included in a group of ballasts that are replacement ballasts that have replaced another ballast in the lighting system. The replacement ballasts may be identified based on a time in which the ballasts were installed in the lighting system, for example.

As the ballast 310 may be included in a group of ballasts flashing their respective link address, the user 322 may be able to identify the link address of multiple ballasts without having to change locations. For example, the user 322 may be able to view each of the lighting fixtures being flashed by the respective ballast in the group to visually identify the link address of each ballast in the group. The user 322 may be able to view each of the flashing lighting fixtures from one location or may move from the physical location of one ballast to the next to identify the link address of each ballast. While FIG. 3 illustrates identification of a link address for ballast 310, the link address may be similarly identified for other load control devices capable of controlling a lighting load, such as an LED driver for example.

The link address of other types of load control devices may be similarly identified, such as a thermostat 326, a keypad (not shown), an AC plug-in load control device 328 (e.g., a switching device), and/or a motorized window treatment 330, for example. The thermostat 326 may indicate its link address to user 322 via a display, by flashing an indicator light in a manner that indicates the link address, or providing any other indication to user 322. A keypad (not shown) may indicate its link address to user 322 by flashing an indicator light (e.g., LED). The AC plug-in load control device 328 may indicate its link address to user 322 via a display, flashing an indicator light in a manner that indicates the link address, providing an indication via a device that is plugged in to the AC plug-in load control device 328, such as by flashing the lamp 334 for example, or providing any other indication to user 322. The motorized window treatment 330 may indicate its link address to user 322 by moving the covering material 332 up and down (e.g., jogging the blinds up and down a predefined distance), wiggling the covering material 332, tilting the covering material 332, or providing any other indication to user 322. Where other types of load control devices are implemented, the functionality of the ballast control device 312 may be included in another type of control device configured to instruct the load control device and/or control the amount of power provided to the electrical load.

Figure 4A:
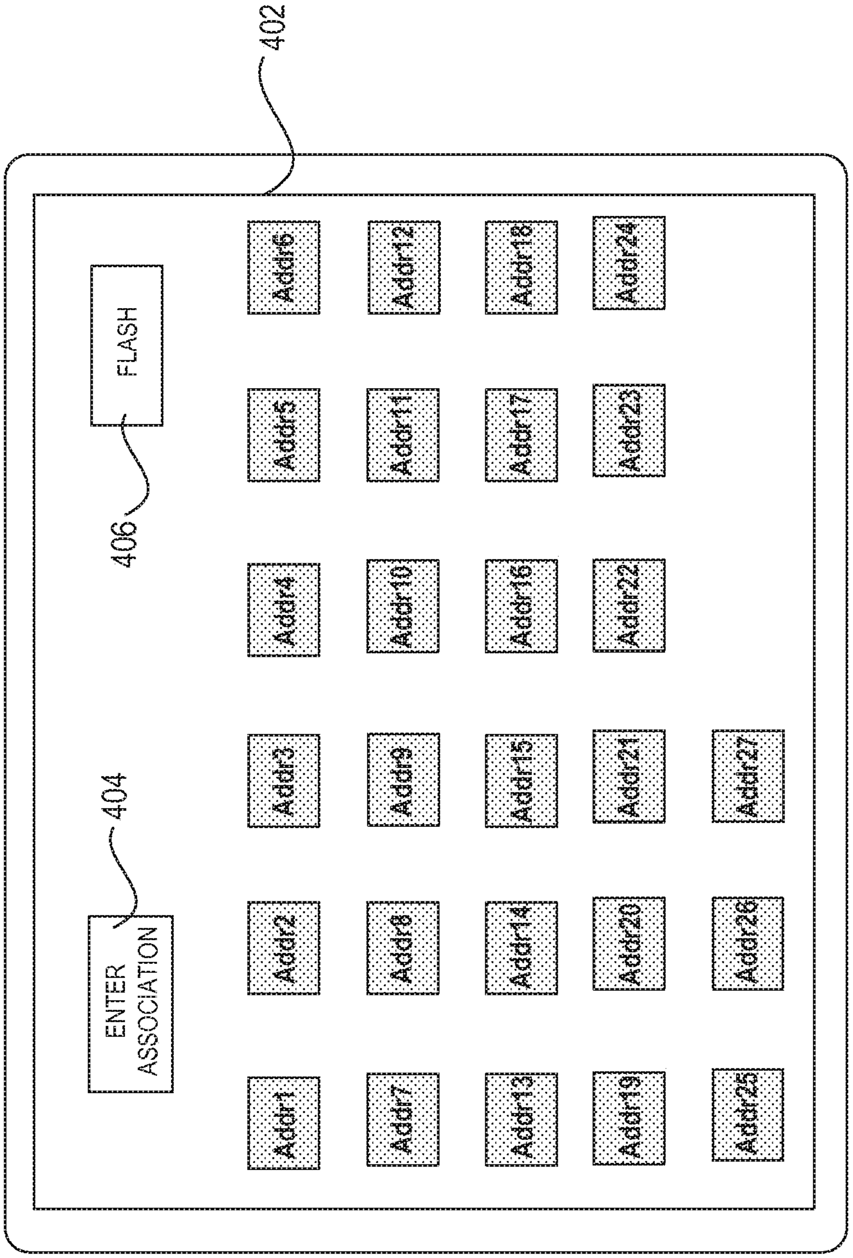
FIG. 4A depicts an example GUI that may be used for flashing electrical loads associated with load control devices for identification and association of a load control device with a link address.
Figure 4B:
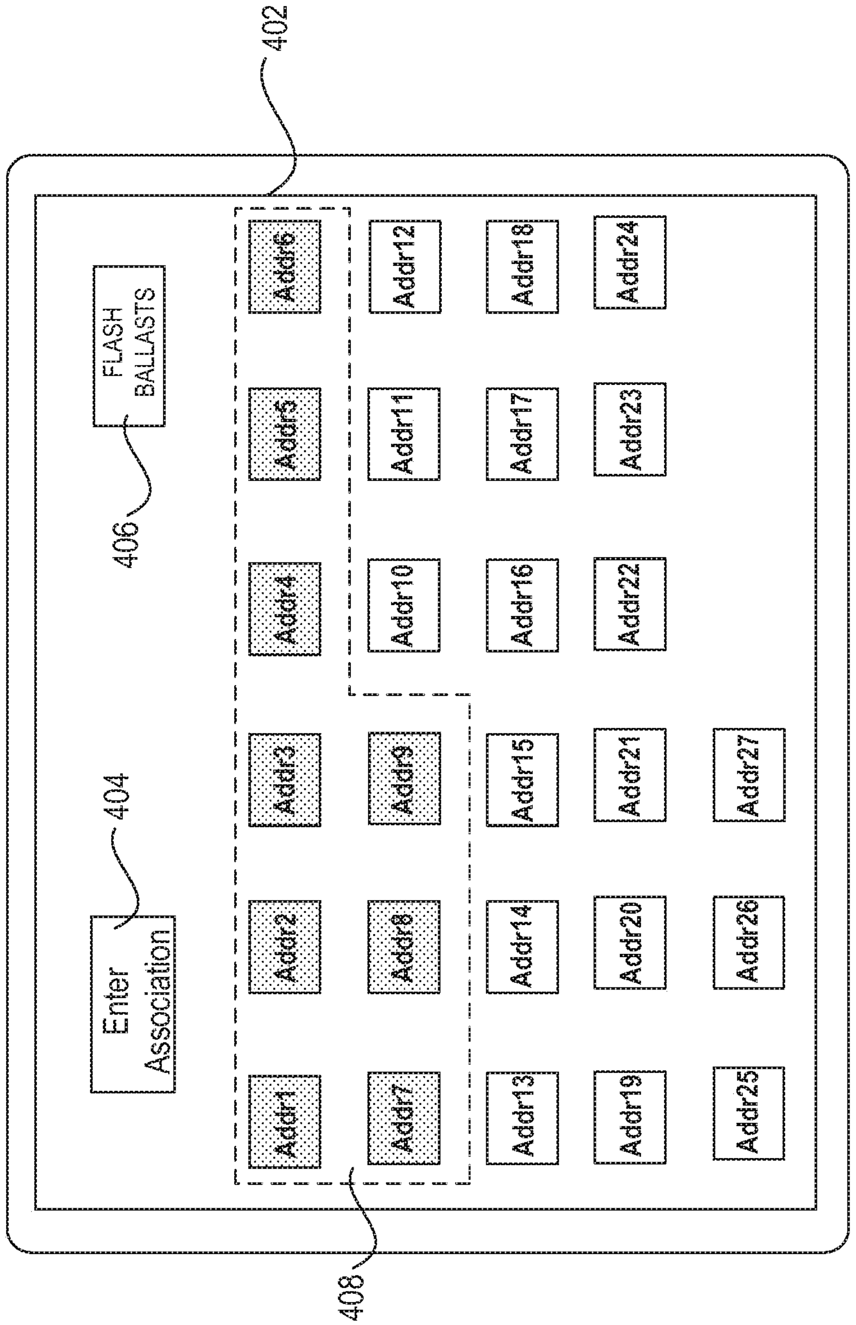
FIG. 4B depicts an example GUI that may be used for flashing a subset of electrical loads associated with load control devices for identification and association of the load control device with a link address.

FIGS. 4A and 4B depict example graphical user interfaces (GUIs) that may be used to send identification instructions to one or more ballasts. The GUIs depicted in FIGS. 4A and 4B may be displayed on user device 324, for example. As shown in FIG. 4A, a GUI 402 may include a number of icons that may be displayed and/or selected to identify a link address of a ballast. The user 322 may select the identification button 406 to send identification instructions to the ballasts causing each of the ballasts to identify their respective link address. Each of the link addresses being identified may be indicated in the GUI 402.

As shown in FIG. 4B, a subset of the icons 408 may be selected for identification. The subset of icons 408 may indicate that they are being identified and/or have been selected for identification. This subset of icons 408 may be displayed differently from the icons that are not selected for identification. After the user 322 identifies the link address of one or more of the ballasts, the user 322 may select the association button 404 to associate the identified link address with the corresponding ballast identifier. This association may be performed such that the user 322 may send control instructions or commands to a ballast at an identified physical location, for example.

Figure 5:
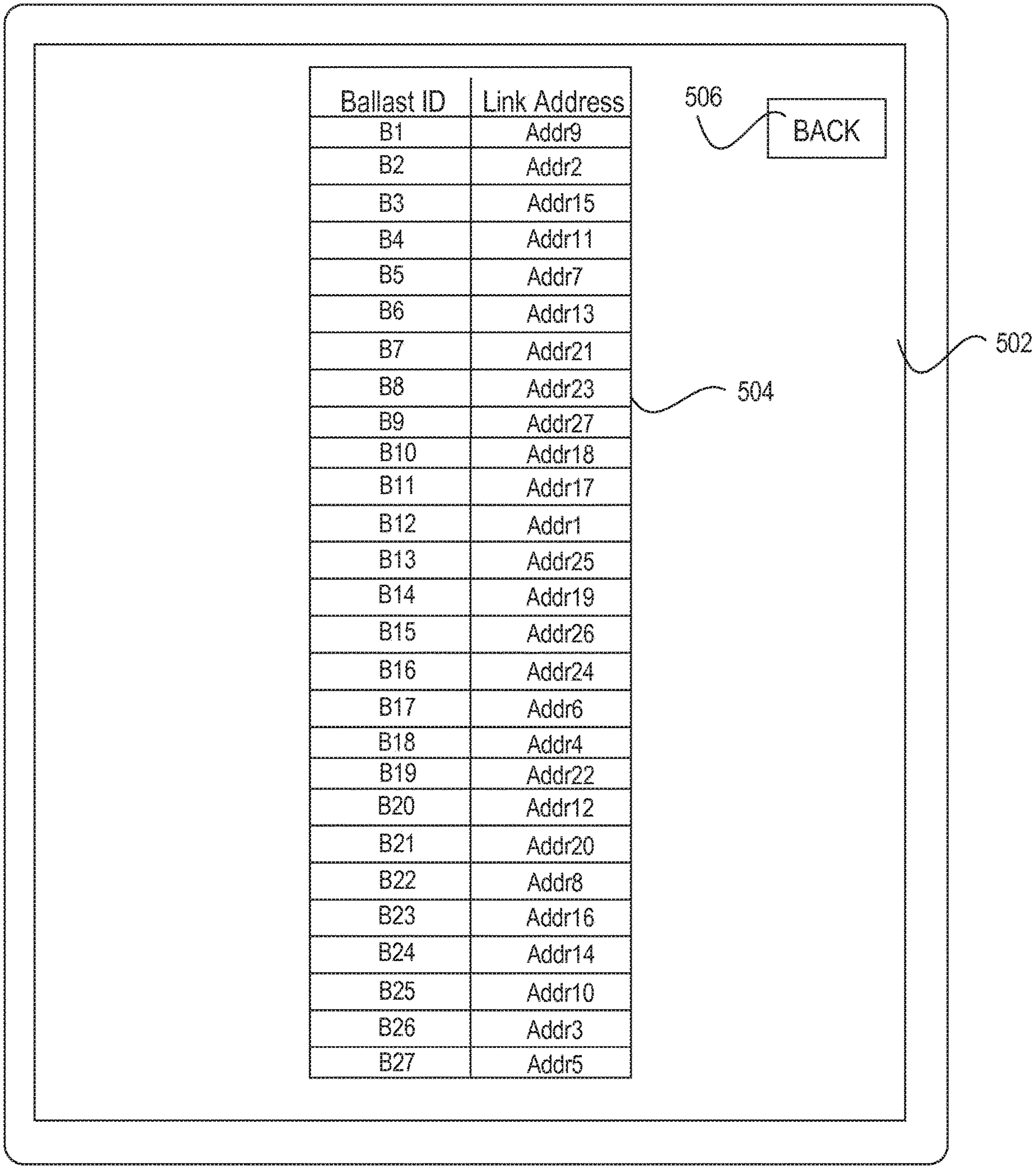
FIG. 5 depicts an example GUI that may be used for association of a link address of a load control device with a physical identifier of the load control device.

FIG. 5 depicts an example GUI that may be used to associate ballast identifiers with their respective link address. As shown in FIG. 5, a GUI 502 may include an association table 504 that may store the association of each ballast identifier with each link address. After the user 322 identifies a link address being indicated by a ballast, the user 322 may associate the link address with the corresponding ballast by entering the link address and/or ballast identifier in the proper location in the association table 504. The association table 504 may include the associations for each of the ballasts in a lighting system or a subset therein. The table 504 may be used to communicate load control instructions and/or commands to an identified ballast using its assigned link address. The GUI 502 may also include a back button 506 that may be selected to return to another GUI for sending identification instructions to ballasts (e.g., as shown in FIGS. 4A and 4B).

Figure 6:
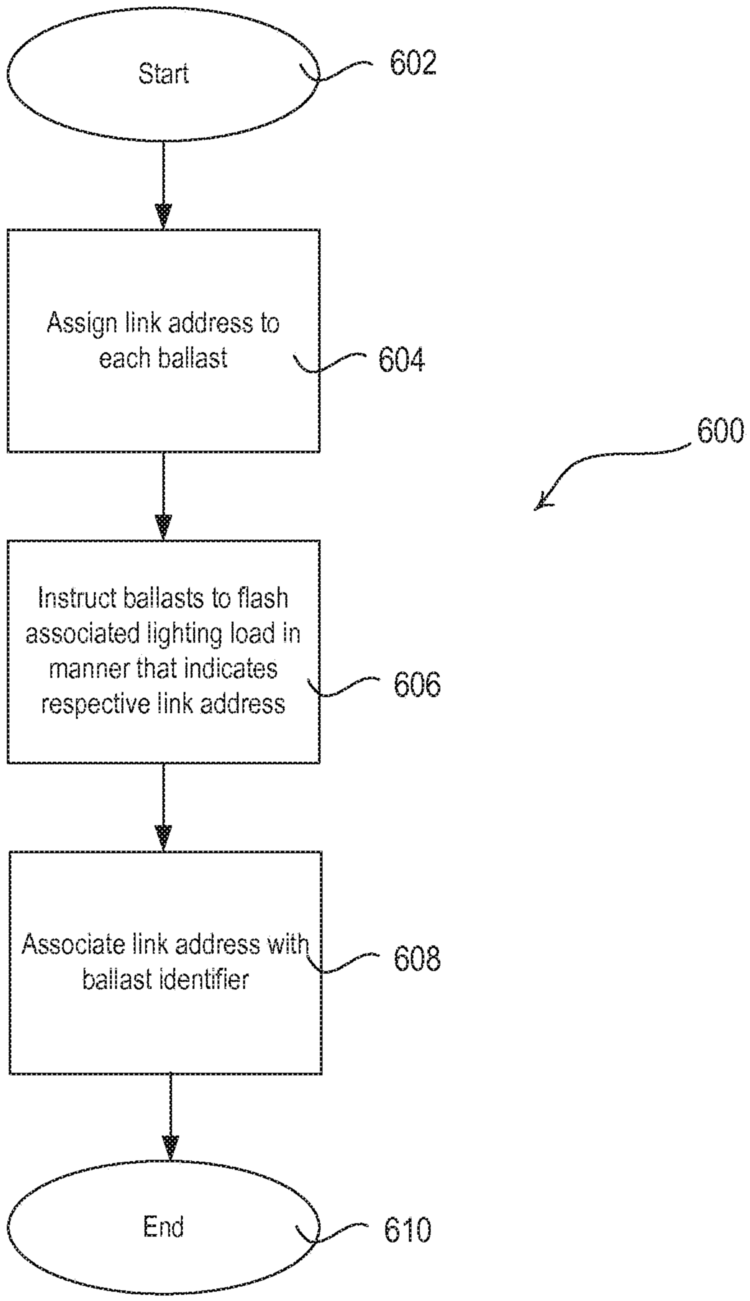
FIG. 6 is a flow diagram depicting an example method for instructing a load control device to flash an associated electrical load in a manner identifying a link address assigned to the load control device.

FIG. 6 is a flow diagram depicting an example method 600 for instructing a load control device to flash an associated electrical load in a manner identifying a link address assigned to the load control device. For example, the method 600 may be executed by the ballast control device 312, the computer 314, or the user device 324 of FIG. 3. As shown in FIG. 6, the method 600 may begin at 602 and a link address may be assigned at 604 to each ballast in a lighting system or a subset of ballasts therein. The link address may be assigned by the ballast control device 312, for example. At 606, each of the ballasts in the lighting system, or a subset thereof, may be instructed to flash an associated lighting load in a manner that indicates a respective link address. When multiple ballasts are instructed to indicate a respective link address, each of the ballasts may indicate their respective link address at the same time. After the link address of a ballast is identified by a user (e.g., visually identified by the user and provided as an input to the ballast control device 312, the computer 314, or the user device 324), the link address may be associated with a ballast identifier at 608. The association may be stored at the user device 324, the ballast control device 312, and/or the computer 314, for example. The method 600 may end at 610 and the associations may be used to configure and/or control the lighting loads in the lighting system.

Figure 7:
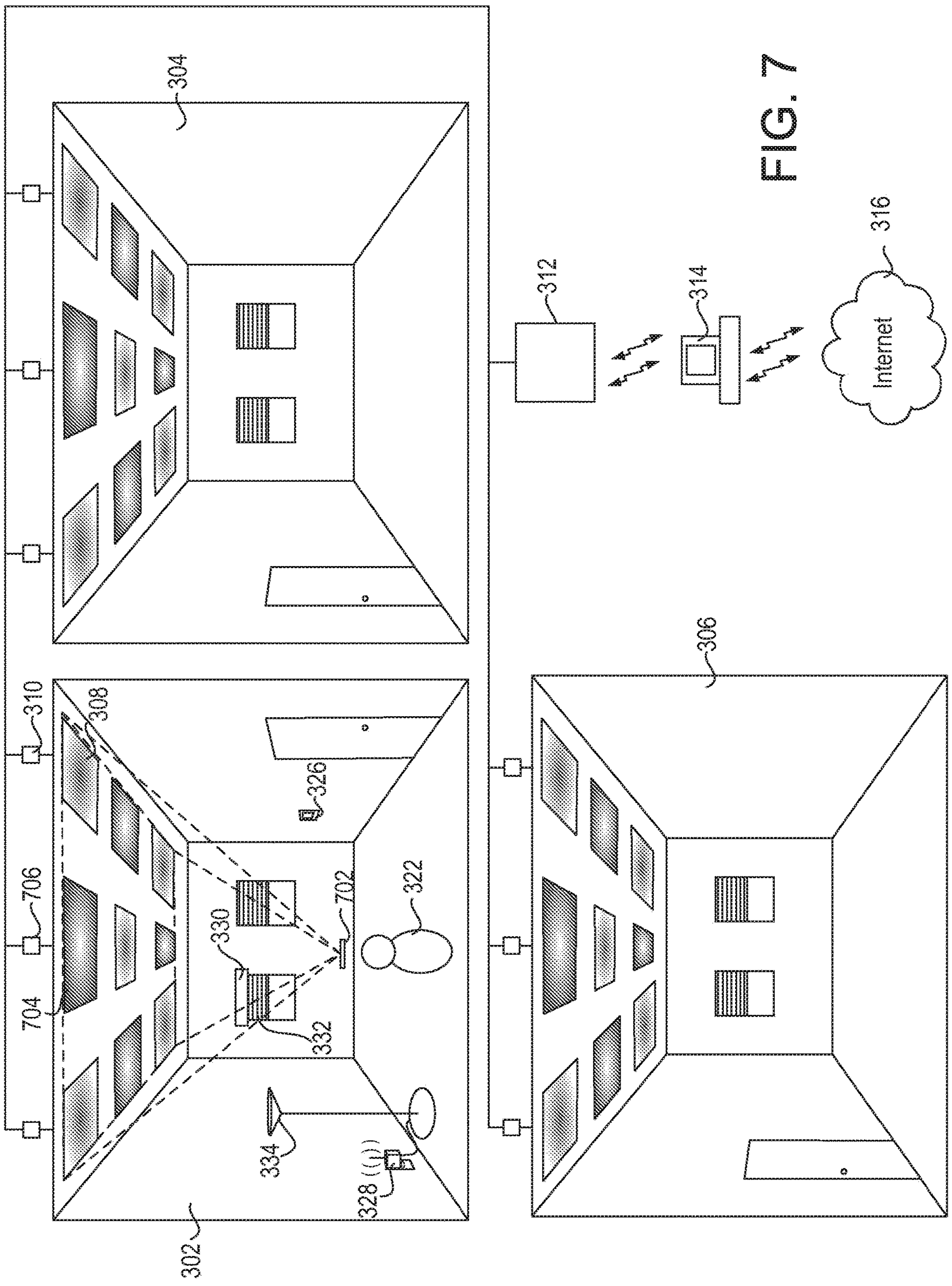
FIG. 7 is a perspective view of a representative environment for using images obtained by a user device to identify a load control device.

FIG. 7 depicts a perspective view of a representative environment for using images or video obtained by a user device 702 to identify a ballast or other load control device. FIG. 7 shows a similar environment as depicted in FIG. 3 with a user device 702 (e.g., a mobile device, a cellular phone, a tablet, a wireless load control device, a photosensor, etc.) that includes a camera or other imaging module for capturing a video or images to identify a ballast. As shown in FIG. 7, after the identification instructions have been sent to the ballasts, the user device 702 may generate images or a video of the ballasts to identify their link address. For example, the user device 702 may create a video of the ballasts in room 302 and may use information in the video to identify the link address being indicated by the ballasts. The camera on the user device 702 may zoom in, zoom out, and/or tilt to capture video of different lighting loads in room 302.

The video captured by user device 702 may include images of lighting fixtures 704 and 308. Each of the lighting fixtures 704 and 308 may be indicating a respective link address, at the same time, for example. The lighting fixture 704 may be indicating the link address of ballast 706, for example, by flashing the link address of ballast 706 in a manner identifiable by the camera on the user device 702. The lighting fixture 308 may be indicating the link address of the ballast 310, for example, by flashing the link address of ballast 310 in a manner identifiable by the camera on the user device 702. The user device 702 may identify the link address of the ballasts 310 and 708 being indicated by lighting fixtures 308 and 704, respectively. The user device 702 may associate the identified link address of the ballasts 310 and 706 with their respective ballast identifiers. In another example, the user device 702 may send the captured video to the ballast control device 312 and/or computer 314 for identification and/or association of the link address.

Figure 8:
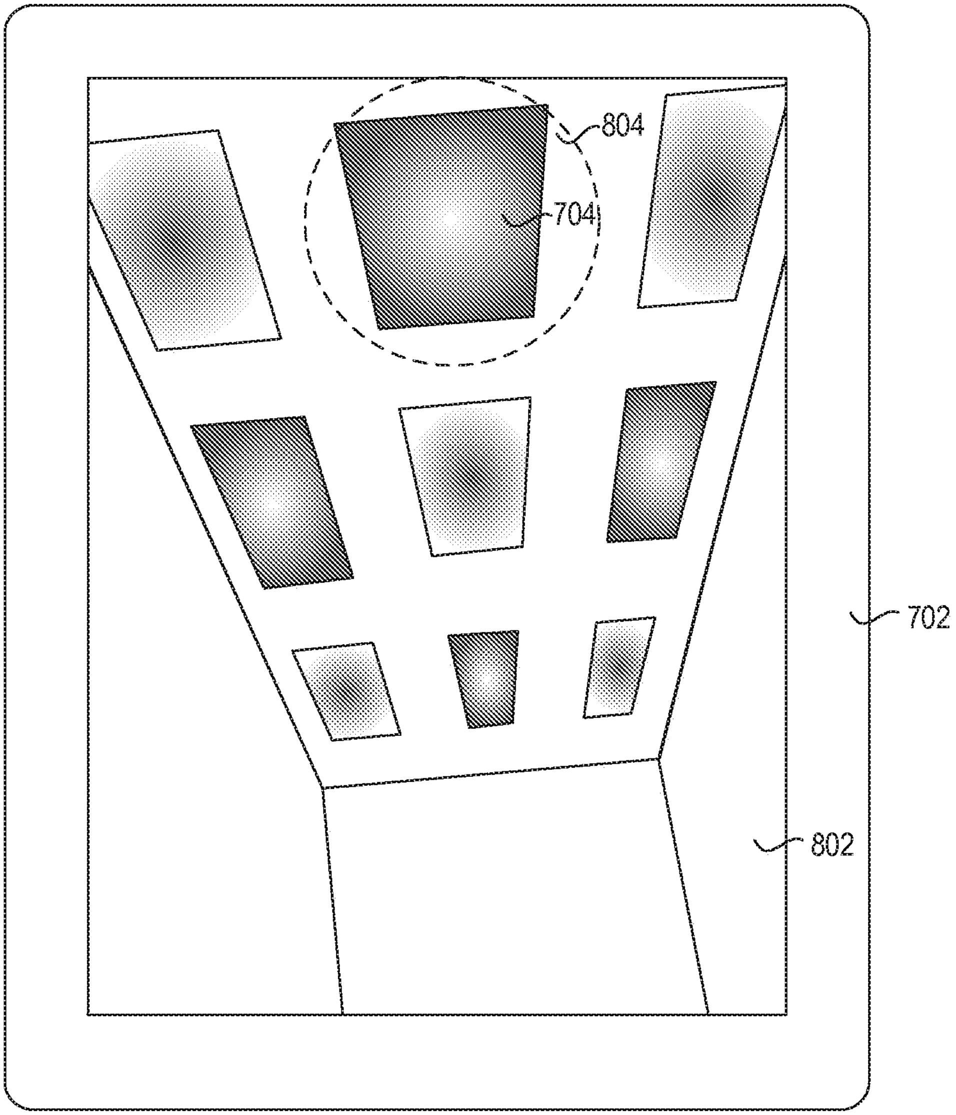
FIG. 8 depicts a representative image that may be used to identify a load control device.

FIG. 8 depicts an example image 802 that may be obtained by a user device 702 for identifying a ballast or other load control device. The image 802 may represent a frame of a video generated by the user device 702, for example. The image 802 may include the lighting fixtures within a room, or a subset thereof. The user device 702 may detect the lighting fixture 704 automatically or based on user indication. The user device 702 may detect the lighting load 704 automatically by comparing portions of the image 802 to determine whether one or more portions of the image 802 exceed a lighting threshold. For example, the user device 702 may determine that the portion of the image 802 within the area 804 exceeds a lighting threshold and may determine that the area 804 includes the lighting fixture 704. The lighting threshold may be relative to the lighting level of the other portions of the image 802 to compensate for the lighting level of different videos, images, user device displays, or the like. In another example, a user may indicate that the lighting load area 804 includes the lighting fixture 704. The user may provide such an indication by selecting within the area 804, circling the area 804, or otherwise indicating the area 804.

After the lighting load area 804 is identified, the user device 702 may analyze incoming video or frames of the video to detect the link address indicated by the lighting load of the lighting fixture 704. For example, the user device 702 may identify the link address of the ballast 706 being signaled by the lighting load of the lighting fixture 704. The lighting load may signal the link address of the ballast 706 by flashing the lighting load of the lighting fixture 704 in a pattern, sequence, rate, or the like that corresponds to the link address. In another example, the lighting load may signal the link address of the ballast 706 by flashing the lighting load for a period of time that may be identified by the user device 702. The user device may detect the flashing of the lighting load by determining whether the lighting fixture 704 is on, off, at an increased dimming level, at a decreased dimming level, etc. The user device 702 may distinguish between the different lighting levels of the lighting fixture 704 by comparing the lighting level within the lighting load area 804 with the lighting level outside of the lighting load area 804. The same, or similar, process may be performed for identifying the link address being indicated by any other lighting loads in the image 802.

Figure 9:
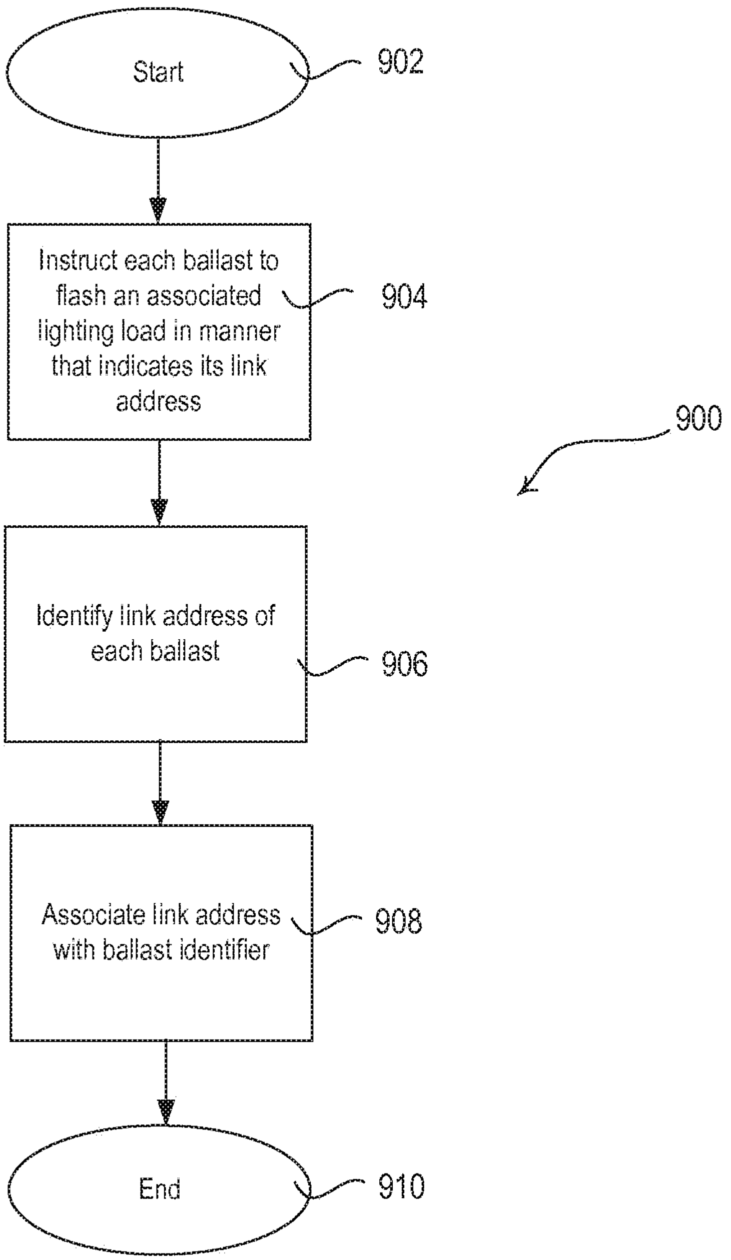
FIG. 9 is a flow diagram depicting an example method for instructing a load control device to flash an associated electrical load in a manner indicating a link address assigned to the load control device and identifying the link address.

FIG. 9 is a flow diagram depicting an example method 900 for identifying a link address assigned to a ballast. As shown in FIG. 9, the method 900 begins at 902 and at 904 a ballast may be instructed to flash an associated lighting load in a manner that identifies its link address. For example, the identification instructions may be sent from the user device 702, the ballast control device 312, and/or the computer 314. After the ballast receives the identification instructions it may indicate its link address. The link address of each ballast may be identified at 906. For example, the indication of the link address may be captured in a video generated at the user device 702. The user device 702 may analyze the video to identify the link address or send the video to the ballast control device 312 and/or computer 314 to identify the link address. At 908, the link address assigned to the ballast may be associated with a ballast identifier to enable a user to physically identify the ballast via the ballast identifier and communicate instructions to the ballast using the link address. If the user device 702 identifies the link address, or it is otherwise provided to the user device 702, the user device may perform the association at 908. In another example, the ballast control device 312 and/or computer 314 may perform the association at 908. The method 900 may end at 910.

Figure 10:
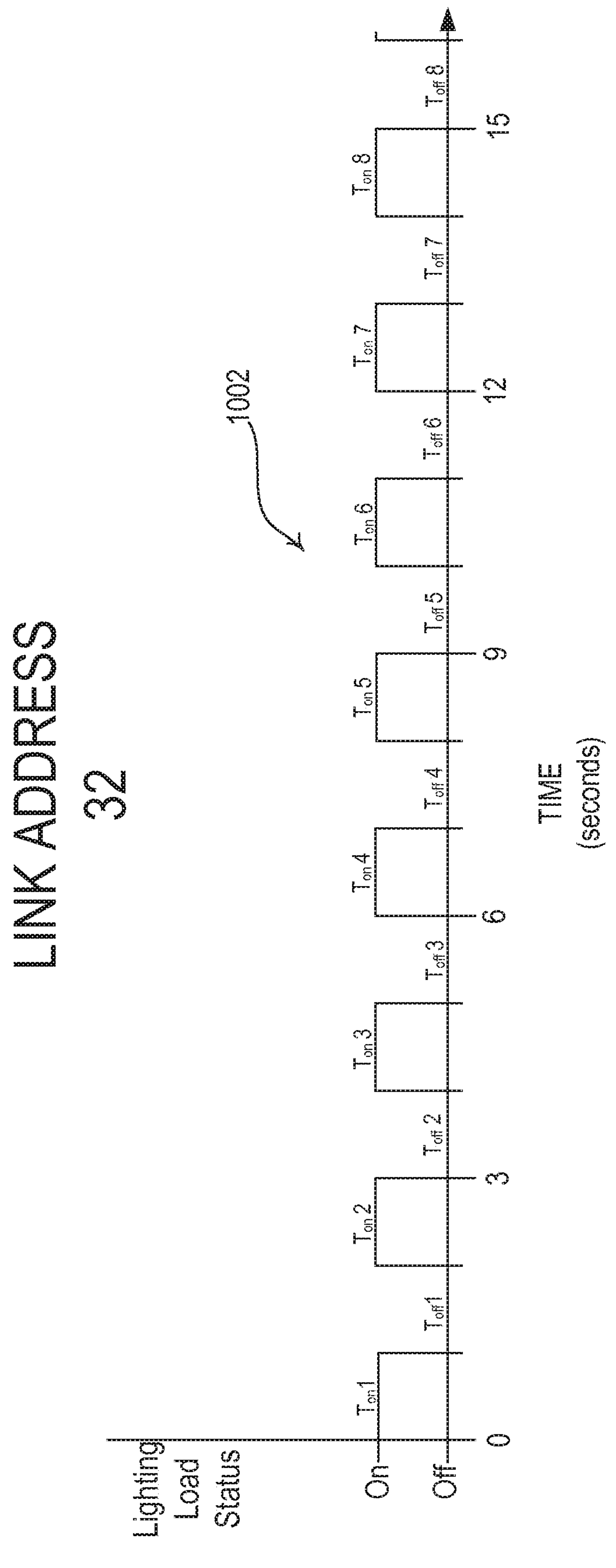
FIG. 10 (Prior Art)
FIG. 10 is a plot depicting an example prior art signal used to indicate a link address of a load control device.

FIG. 10 is a plot depicting a prior art example signal 1002 for indicating a link address of a ballast. In the prior art example, a user may know the link address assigned to each ballast in a group of ballasts, but may not know to which ballast in the group the link address is assigned. To identify the ballast that is assigned the link address '32', a user may instruct the ballast to drive a corresponding lighting load with signal 1002. The signal 1002 may cause the lighting load to indicate that the corresponding ballast that has been assigned the link address '32' by flashing on for a period of time $T_{on}$ and off for a period of time $T_{off}$. Each $T_{on}$ may be separated by a $T_{off}$. Each period of time $T_{on}$ may be equal. Each period of time $T_{off}$ may be equal to the period of time $T_{on}$. The user may identify the ballast corresponding to the flashing lighting load and may associate the identified ballast with the link address '32'. The user may then cause the ballast assigned the next link address (e.g., link address '33') to flash its lighting load for identification using the same signal 1002. The user may identify each of the ballasts one at a time by causing them to flash according to the signal 1002.

Figure 11A:
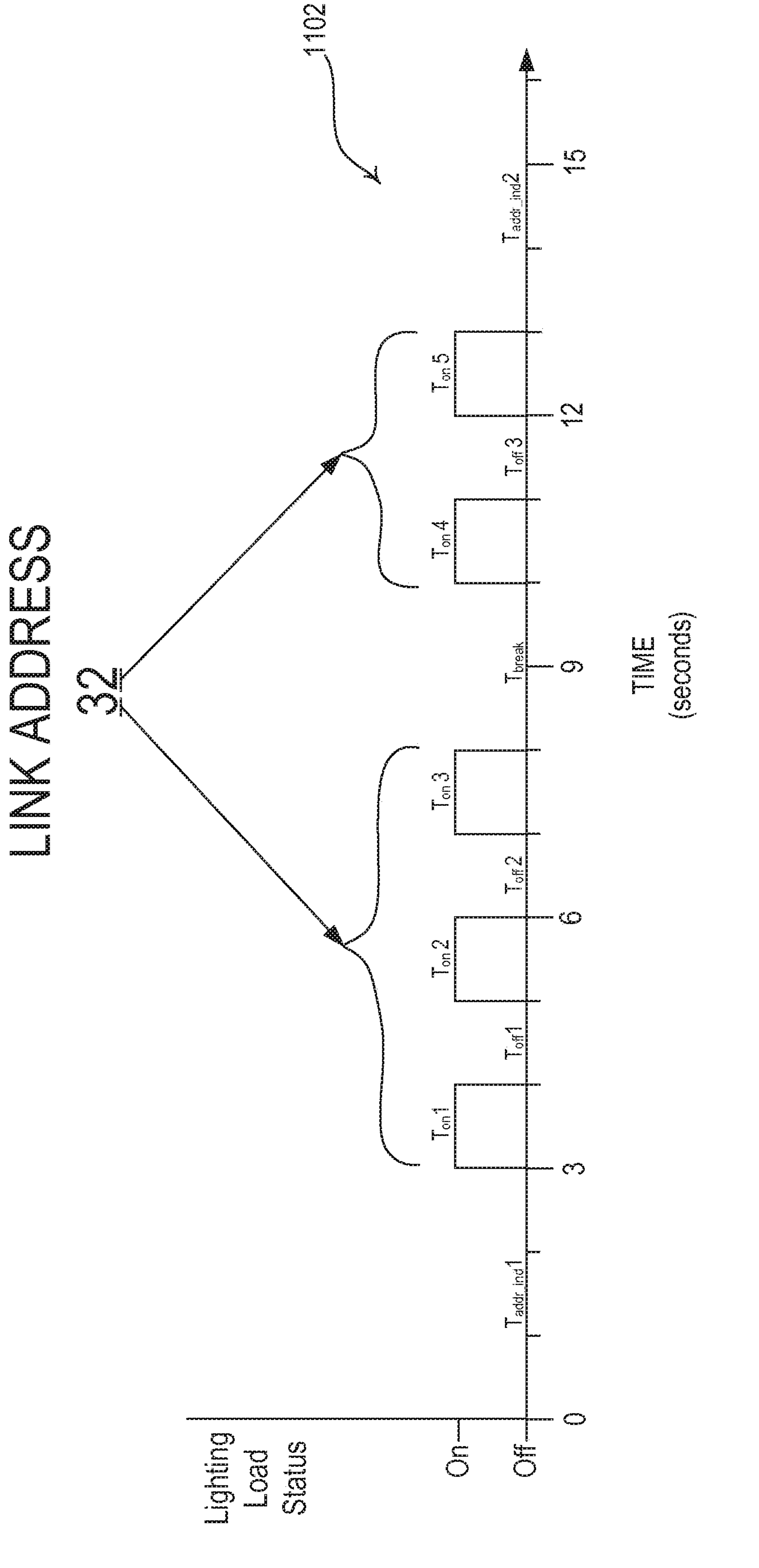
FIG. 11A-11C are plots depicting other example signals that may be used to indicate a link address of a load control device.
Figure 11B:
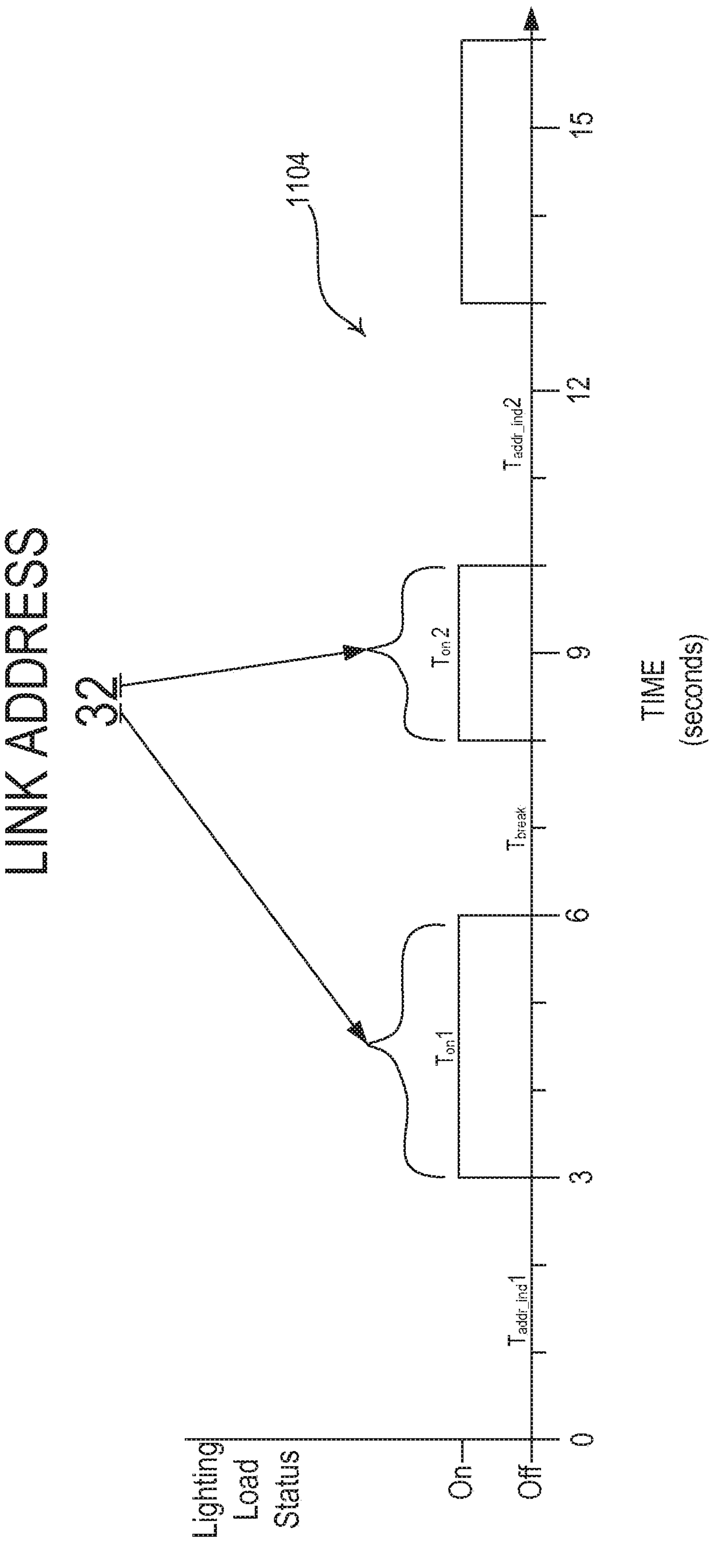
Figure 11C:
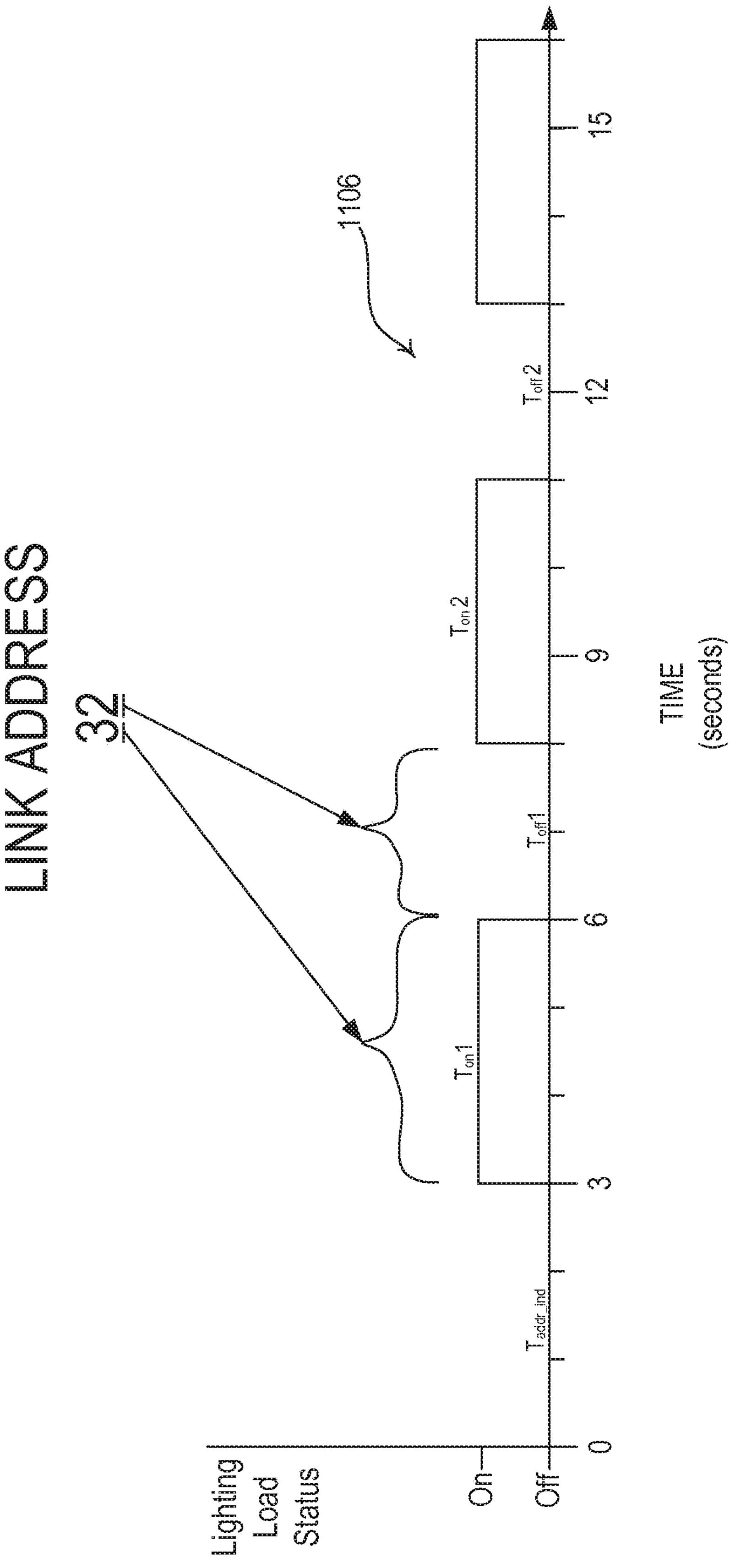

FIGS. 11A to 11C are plots depicting other example signals that may be used to indicate the link address assigned to a ballast. As shown in FIGS. 11A to 11C, to indicate a link address assigned to a ballast, the ballast may drive one or more controlled lighting loads using a signal 1102, 1104, or 1106 to cause an amount of power provided to the lighting load to increase and decrease in a manner that indicates the link address assigned to the ballast. Similar signals may be used to indicate a link address having any number of digits. Similar signals may also be used to indicate a link address that includes an alphanumeric sequence or any other form of address.

As shown in FIG. 11A, a ballast may drive the lighting loads with a signal 1102 in a timing sequence that causes a corresponding lighting load to flash on and off in a manner that indicates the link address assigned to the ballast. The signal 1102 may begin by signaling that the link address is being indicated. The signal 1102 may indicate that the link address is to follow by causing the lighting load to turn off or delay turning on for a period of time $T_{addr\_ind}$. The period of time $T_{addr\_ind}$ may be a three second period of time, for example. The signal 1102 may also indicate that the link address is to follow by causing the lighting load to turn on or flash for the period of time $T_{addr\_ind}$.

The signal 1102 may transition high and low (e.g., to turn on and off the controlled lighting loads) in a sequence or pattern that indicates each digit in the link address. To indicate the link address '32', the signal 1102 may indicate a three in the tens digit by causing the lighting load to turn on for three consecutive on times $T_{on}1$, $T_{on}2$, $T_{on}3$ and may indicate a two in the ones digit by causing the lighting load to turn on two consecutive on times $T_{on}4$, $T_{on}5$. The length of each period of time $T_{on}$ (e.g., on times $T_{on}1$-$T_{on}5$ for which the controlled lighting loads are turned on) may be equal. As shown in FIG. 11A, the on times $T_{on}1$-$T_{on}5$ may each include a one second period of time. Each on time $T_{on}$ may count a digit of the link address. When the count for a digit is greater than one, each of the on times $T_{on}$ may be separated from a previous on time $T_{on}$ and/or from a next on time $T_{on}$ by an off time $T_{off}$ during which the lighting load is turned off. For example, the on times $T_{on}4$, $T_{on}5$ of the ones digit may be separated by the off time $T_{off}3$. The length of each of the off times $T_{off}$ may be equal to or different than the length of on times $T_{on}$. As shown in FIG. 11A, the off times $T_{off}1$, $T_{off}2$, and $T_{off}3$ may each include a one second period of time. The on times $T_{on}$ and the off times $T_{off}$ may include a different period of time than $T_{addr\_ind}$ for distinction.

The signal 1102 may indicate a transition to the next digit in the link address. The signal 1102 may cause the lighting load to turn off for a break period of time $T_{break}$ to indicate a break in the signal 1102 between digits. The break period $T_{break}$ may be otherwise indicated by turning the lighting load on or off or by flashing the lighting load on and off. The break period $T_{break}$ may include a period of time that is different than the on time $T_{on}$, the off time $T_{off}$, or the period of time $T_{addr\_ind}$ for distinction. For example, the break period $T_{break}$ may include a two second period of time.

FIG. 11B depicts a signal 1104 that may use the length of an on time $T_{on}$ itself to indicate each portion of the link address. The signal 1104 may use the length of the on times $T_{on}1$, $T_{on}2$ to indicate each digit of the link address. For example, to indicate the link address '32', the signal 1104 may indicate a three in the tens digit by causing the lighting load to turn on for the on time $T_{on}1$ that has a length of three seconds and may indicate a two in the ones digit by causing the lighting load to turn on for the on time $T_{on}2$ that has a length of two seconds. The signal 1104 may indicate a transition to the next digit in the link address using the break period $T_{break}$. The period of time $T_{addr\_ind}$ may be used to indicate that the link address is to follow. Similar signals may be used to indicate each digit when the lighting load is turned off.

FIG. 11C depicts a signal 1106 that may use the length of an on time $T_{on}$ or the length of an off time $T_{off}$ to indicate each portion of the link address assigned to a ballast. The signal 1106 may use the length of the on time $T_{on}1$ to indicate a digit of the link address and may use the length of the off time $T_{off}1$ to indicate another digit of the link address. For example, to indicate the link address '32', the signal 1106 may cause the lighting load to turn on for the on time $T_{on}1$ that has the length of three seconds to indicate the tens digit and turn off for the off time $T_{off}1$ that has a length of two seconds to indicate the ones digit in the link address.

The link address indicated by the signals 1102, 1104, and/or 1106 may be repeated a predetermined number of times or until terminated. As shown in FIGS. 11A and 11B, the period of time $T_{addr\_ind}1$ may signal that the link address is being indicated a first time, the period of time $T_{addr\_ind}2$ may signal that the link address is being indicated another time, and so on. As shown in FIG. 11C, the period of time $T_{addr\_ind}$ may be performed once at the beginning of the signal. The signal 1106 may repeat the indication of link address by following the on time $T_{on}1$ and the off time $T_{off}1$ with the on time $T_{on}2$ and the off time $T_{off}2$ and so on until terminated. The signals 1102, 1104, and/or 1106 may indicate that they have finished signaling the link address, for example, by turning on and/or off for a period of time.

Figure 12A:
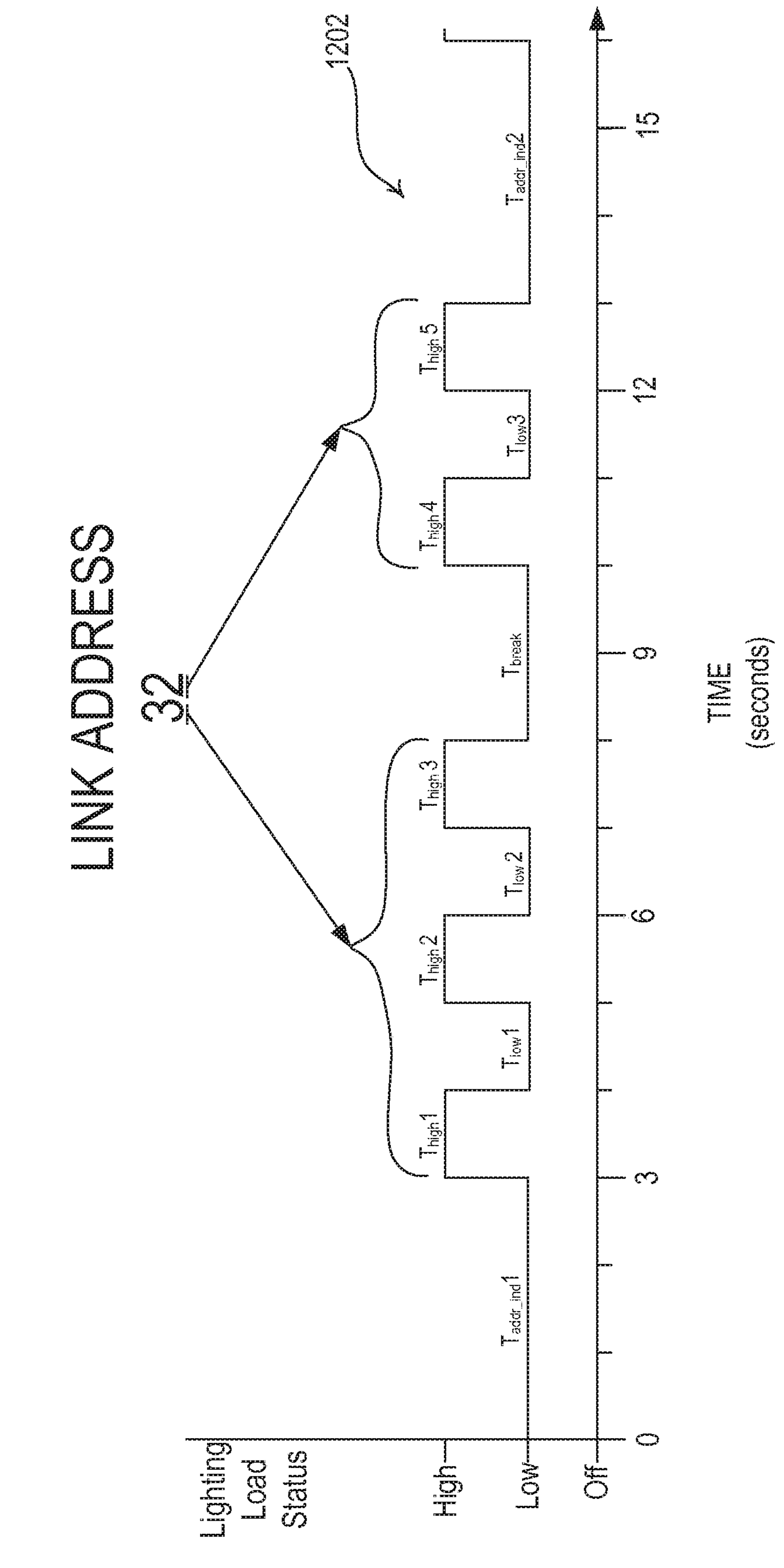
FIGS. 12A-12C are plots depicting other example signals that may be used to indicate a link address of a load control device.
Figure 12B:
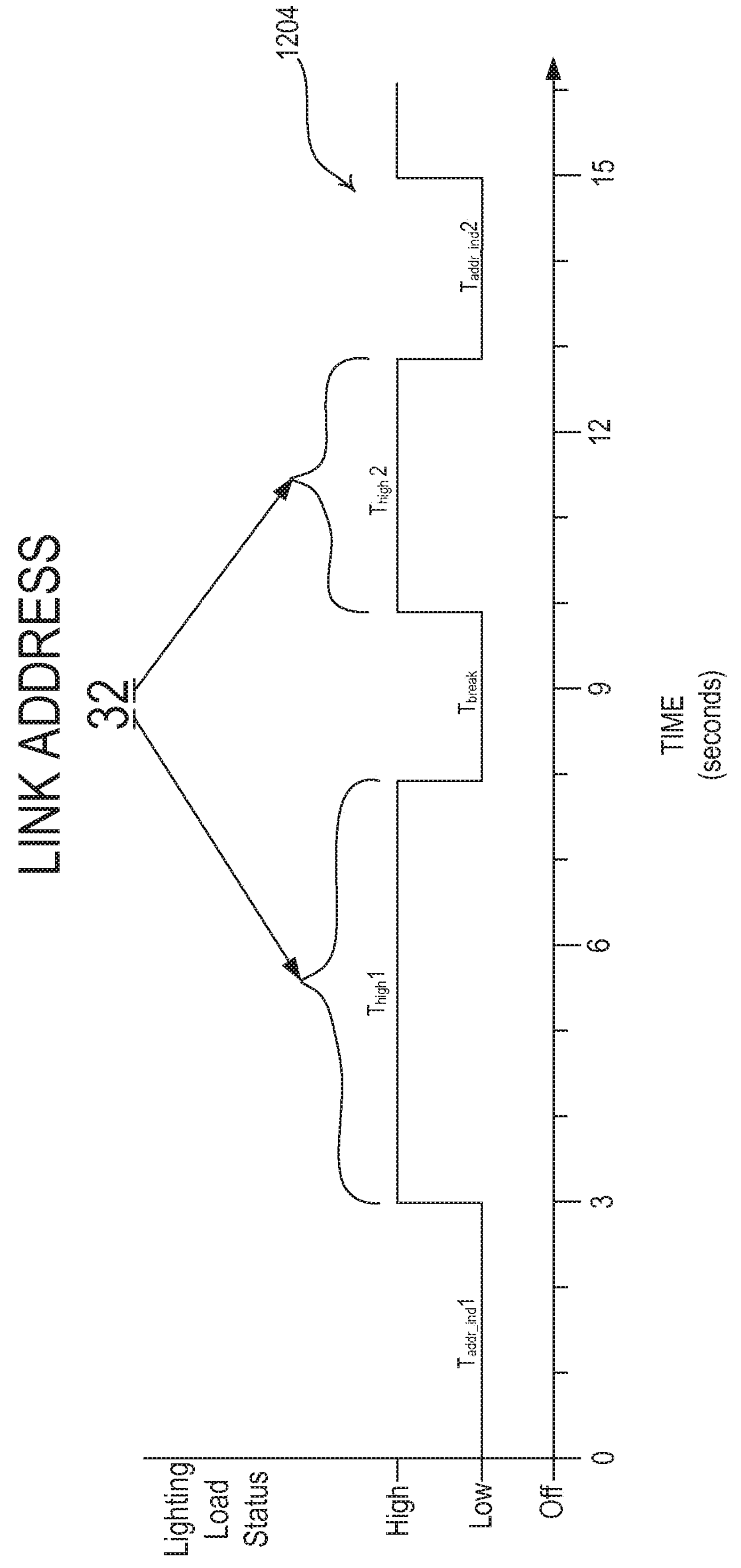
Figure 12C:
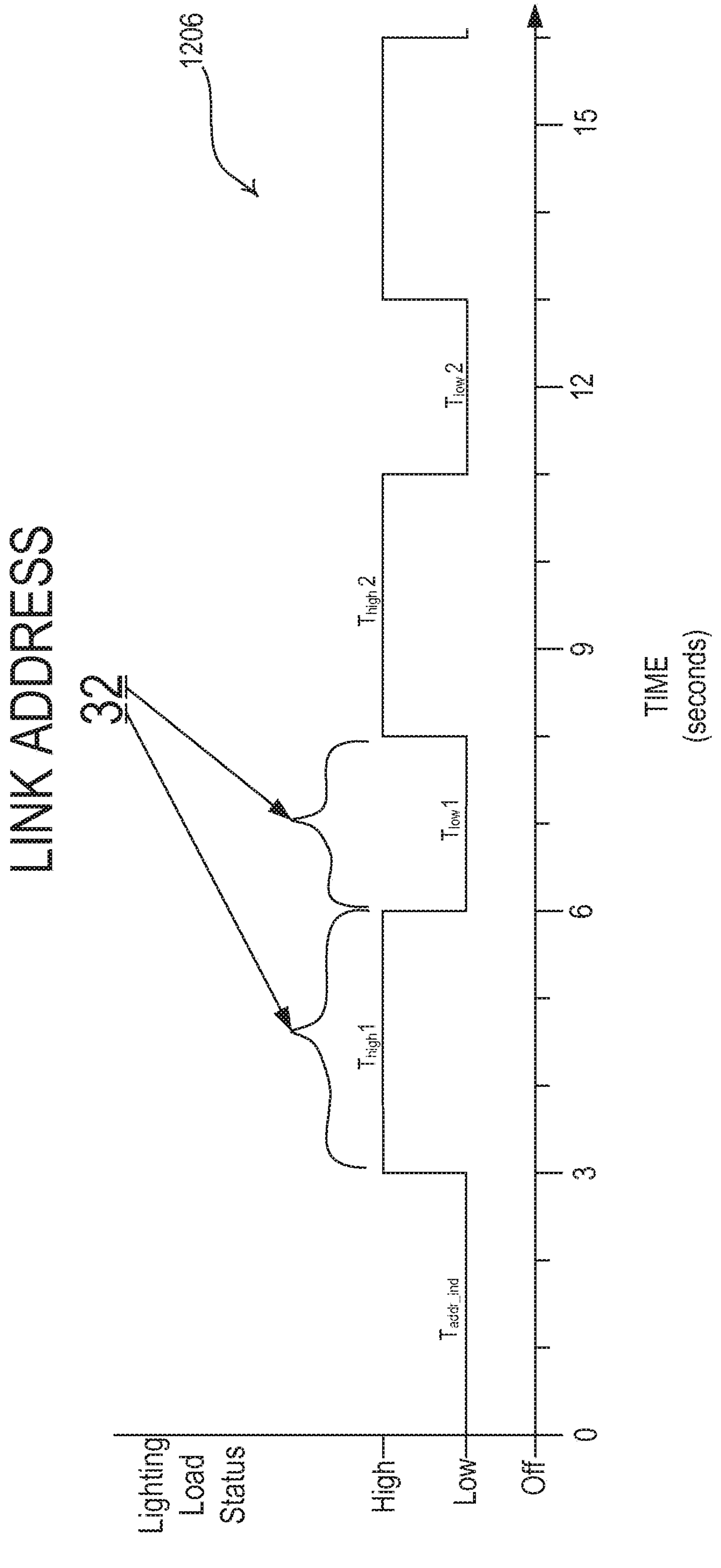

FIGS. 12A to 12C are plots depicting other example signals that may be used to indicate the link address assigned to a ballast. As shown in FIGS. 12A to 12C, signals 1202 to 1206 may use different dimming levels to indicate a link address assigned to a ballast. The ballast may drive the controlled lighting loads using a signal 1202, 1204, or 1206 to cause the lighting load to increase and decrease in a manner that indicates the link address assigned to the ballast. Similar signals may be used to indicate a link address having any number of digits. Similar signals may also be used to indicate a link address that includes an alphanumeric sequence or any other form of address.

As shown in FIG. 12A, a ballast may drive the lighting load with a signal 1202 in a timing sequence that causes a corresponding lighting load to modulate a dimming level between high and low in a manner that indicates the link address assigned to the ballast. The signal 1202 may begin by signaling that the link address is being indicated. The signal 1202 may indicate that the link address is to follow by causing the lighting load to turn to a low dimming level for a period of time $T_{addr\_ind}$. The period of time $T_{addr\_ind}$ may be a three second period of time, for example. The signal 1202 may indicate that the link address is to follow by causing the lighting load to turn to a high dimming level, flash the dimming level high and low, or turn the lighting load off for the period of time $T_{addr\_ind}$.

The signal 1202 may cause the dimming level of the lighting load to increase and decrease in a pattern or sequence to indicate each digit in the link address. To indicate the link address '32', the signal 1202 may cause a lighting load to increase the dimming level three consecutive high times $T_{high}1$, $T_{high}2$, $T_{high}3$ to indicate a three in the tens digit of the link address and may cause the lighting load to increase the dimming level for two consecutive high times $T_{high}4$, $T_{high}5$ to indicate a two in the ones digit. Each increase in the dimming level may be separated by a decrease in the dimming level. The length of each high time $T_{high}$ (e.g., high times $T_{high}1$-$T_{high}5$ for which the dimming level is increased) may be equal. As shown in FIG. 12A, $T_{high}1$-$T_{high}5$ may each include a one second period of time. Each high time $T_{high}$ may be used to count a digit of the link address. When the count for a digit is greater than one, each of the high times $T_{high}$ may be separated from the previous high time $T_{high}$ and/or from the next high time $T_{high}$ by a low time $T_{low}$ during which the dimming level may be decreased. For example, the high times $T_{high}4$, $T_{high}5$ of the ones digit are separated by the low time $T_{low}3$. The length of each of the low times $T_{low}$ may be equal to or different than the length of the high times $T_{high}$. As shown in FIG. 11A, the low times $T_{low}1$, $T_{low}2$, and $T_{low}3$ may include a one second period of time. The high times $T_{high}$ and the low times $T_{low}$ may include a different period of time than $T_{addr\_ind}$ for distinction.

The signal 1202 may indicate a transition to the next digit in the link address. The signal 1202 may cause the lighting load to decrease the dimming level for a break period of time $T_{break}$ to indicate a break in the signal 1202 between digits. The decreased dimming level may include a dimming level of zero, in which the lighting load may be turned off. The break period $T_{break}$ may be otherwise indicated by increasing the lighting load, decreasing the lighting load, or flashing the lighting load between higher and lower dimming levels.

FIG. 12B depicts a signal 1204 that may cause the lighting load to increase the dimming level for the length of a high time $T_{high}$ to indicate each portion of the link address. The signal 1204 may cause the lighting load to increase a dimming level for the length of the high times $T_{high}1$, $T_{high}2$ to indicate each digit of the link address. For example, to indicate the link address '32', the signal 1204 may indicate a three in the tens digit by causing the lighting load to increase a dimming level for the high time $T_{high}1$ that has a length of three seconds and indicate a two in the ones digit by increasing the dimming level for the high time $T_{high}2$ that has a length of two seconds. The signal 1204 may indicate a transition to the next digit in the link address by decreasing the dimming level for the break period $T_{break}$. The period of time $T_{addr\_ind}$ may be used to indicate that the link address is to follow. Similar signals may be used to indicate each digit when the dimming level is decreased.

FIG. 12C depicts a signal 1206 that may cause the lighting load to increase the dimming level for the length of a high time $T_{high}$ or decrease the dimming level for the length of a low time $T_{low}$ to indicate each portion of the link address. The signal 1206 may increase a dimming level of a lighting load for the length of the time $T_{high}1$ to indicate a digit of the link address and may decrease the dimming level of a lighting load for the length of the low time $T_{low}1$ to indicate another digit of the link address. For example, to indicate the link address '32', the signal 1206 may indicate a three in the tens digit by increasing the dimming level for the high time $T_{high}1$ that has a length of three seconds and indicate a two in the ones digit by decreasing the dimming level for the low time $T_{low}1$ that has a length of two seconds.

The link address indicated by the signals 1202, 1204, and/or 1206 may be repeated a predetermined number of times or until terminated. As shown in FIGS. 12A and 12B, the period of time $T_{addr\_ind}1$ may signal that the link address is being indicated a first time, the period of time $T_{addr\_ind}2$ may signal that the link address is being indicated another time, and so on. As shown in FIG. 12C, the period of time $T_{addr\_ind}$ may be performed once at the beginning of the signal. The signal 1206 may repeat the indication of the link address by following the high time $T_{high}1$ and the low time $T_{low}1$ with the high time $T_{high}2$ and the low time $T_{low}2$ and so on until terminated. The signals 1202, 1204 and/or 1206 may indicate that they are finished signaling the link address, for example, by increasing and/or decreasing the dimming level for a period of time.

The link address may be indicated based on the amount of power provided to the lighting load. The dimming level itself may indicate the link address of the ballast. For example, a ballast may indicate its link address by causing a lighting load to provide a percentage of its total lighting intensity corresponding to its link address. The total number of dimming levels or the percentage of the lighting intensity for each link address may be based on the number of ballasts controlled by a ballast control device. For example, a ballast control device that controls ten ballasts may assign a different link address to each ten percent increase in lighting intensity.

In another example, each portion of the link address may be indicated by a different dimming level. For example, the ballast may indicate each digit of the link address by causing the lighting load to switch to a corresponding dimming level (e.g., 10% lighting intensity indicates a '1', 20% lighting intensity indicates a '2', etc.). The link address '32' may be indicated by ballast causing the lighting load to provide thirty percent of its total lighting intensity for the tens digit and changing to twenty percent of its total lighting intensity for the ones digit.

The link address may be indicated by the color of the lighting load, such as for an LED light or other lighting fixture capable of providing different colors of light, for example. Each portion of the link address may be indicated by a different color of light provided by the lighting fixture. For example, the ballast may indicate each digit of the link address by causing the lighting fixture to switch to a corresponding lighting color. In another example, each color may correspond to a different link address. The lightest color or darkest color may be assigned to the lowest digit (e.g., the number '1') or link address and subsequent numbers may be assigned as the shade gets lighter or darker.

The different levels of lighting intensity and/or the different colors of the lighting load may be recognizable by a user or a camera on a user device. A user device may be configured to recognize the different lighting levels and/or colors. For example, the camera on the user device may generate a video of a lighting load changing colors or dimming levels. A user may enter the number of load control devices controlled by a ballast. The user device may determine the dimming levels from the video and the number of load control devices controlled by a ballast control device. In another example, a user may assign an address to the dimming levels or colors by entering the assignments into the user device.

The link address may be indicated in binary form, trinary form, or another base numeral form. To indicate the link address in binary form, the ballast may flash a corresponding lighting load (e.g., by turning the lighting load on and off, increasing and decreasing the dimming level, etc.) to indicate the zeros and ones that make up the link address in binary form. To indicate the link address in trinary form, the ballast may flash a corresponding lighting load (e.g., by turning the lighting load on, off, and flashing) to indicate one of the trinary digits that make up the link address in trinary form. In order to indicate the link address in binary, trinary, or other form, a lighting load may indicate a ‘0’ in a predefined manner. For example, the lighting load may flash ten times to indicate a ‘0’.

As timing may be used to indicate the link address of a ballast, the timing may be indicated such that it is recognizable by a user or a camera on a user device. When a camera on a user device generates a video that includes the indication of the link address assigned to a ballast, the timing of the camera used to generate the video may be synchronized with the timing of the ballast. When a user device or other system device is used to identify the link address indicated by the ballast, the processor used to identify the link address may be synchronized with the processor of the ballast.

Figure 13:
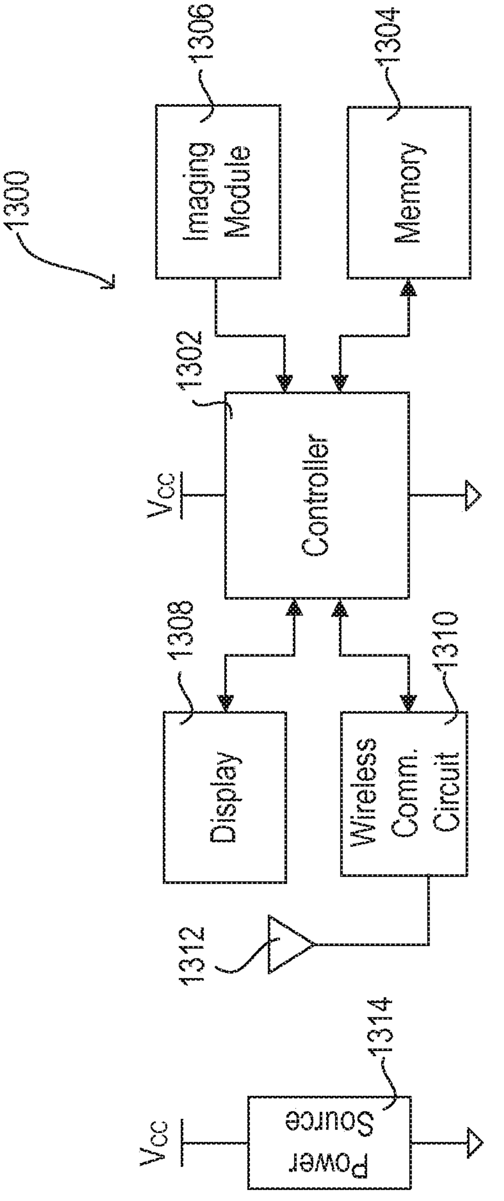
FIG. 13 is block diagram depicting an example device that may be used to indicate and/or identify a link address of a load control device.

FIG. 13 is a block diagram illustrating an example user device 1300 as described herein. The user device 1300 may include the user device 702, user device 324, and/or computer 114 for example. The user device 1300 may include a controller 1302 for controlling the functionality of the user device 1300. The controller 1302 may include one or more general purpose processors, special purpose processors, conventional processors, digital signal processors (DSPs), microprocessors, integrated circuits, a programmable logic device (PLD), application specific integrated circuits (ASICs), and/or the like. The controller 1302 may perform signal coding, data processing, power control, image processing, input/output processing, and/or any other functionality that enables the user device 1300 to perform as described herein. The controller 1302 may store information in and/or retrieve information from the memory 1304. The memory 1304 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory.

The user device 1300 may include a wireless communication circuit 1310 for wirelessly transmitting and/or receiving information. For example, the wireless communications circuit 1310 may include an RF transceiver for transmitting and receiving RF signals via an antenna 1312, or other communications module capable of performing wireless communications. Wireless communications circuit 1310 may be in communication with the controller 1302. The controller 1302 may also be in communication with a display 1308 for providing information to a user. The communication between the display 1308 and the controller 1302 may be a two way communication, as the display 1308 may include a touch screen module capable of receiving information from a user and providing such information to the controller 1302. Each of the modules within the user device 1300 may be powered by a power source 1314. The power source 1314 may include an AC power supply or DC power supply, for example. The power source 1314 may generate a DC supply voltage $V_{CC}$ for powering the modules within the user device 1300.

Figure 14:
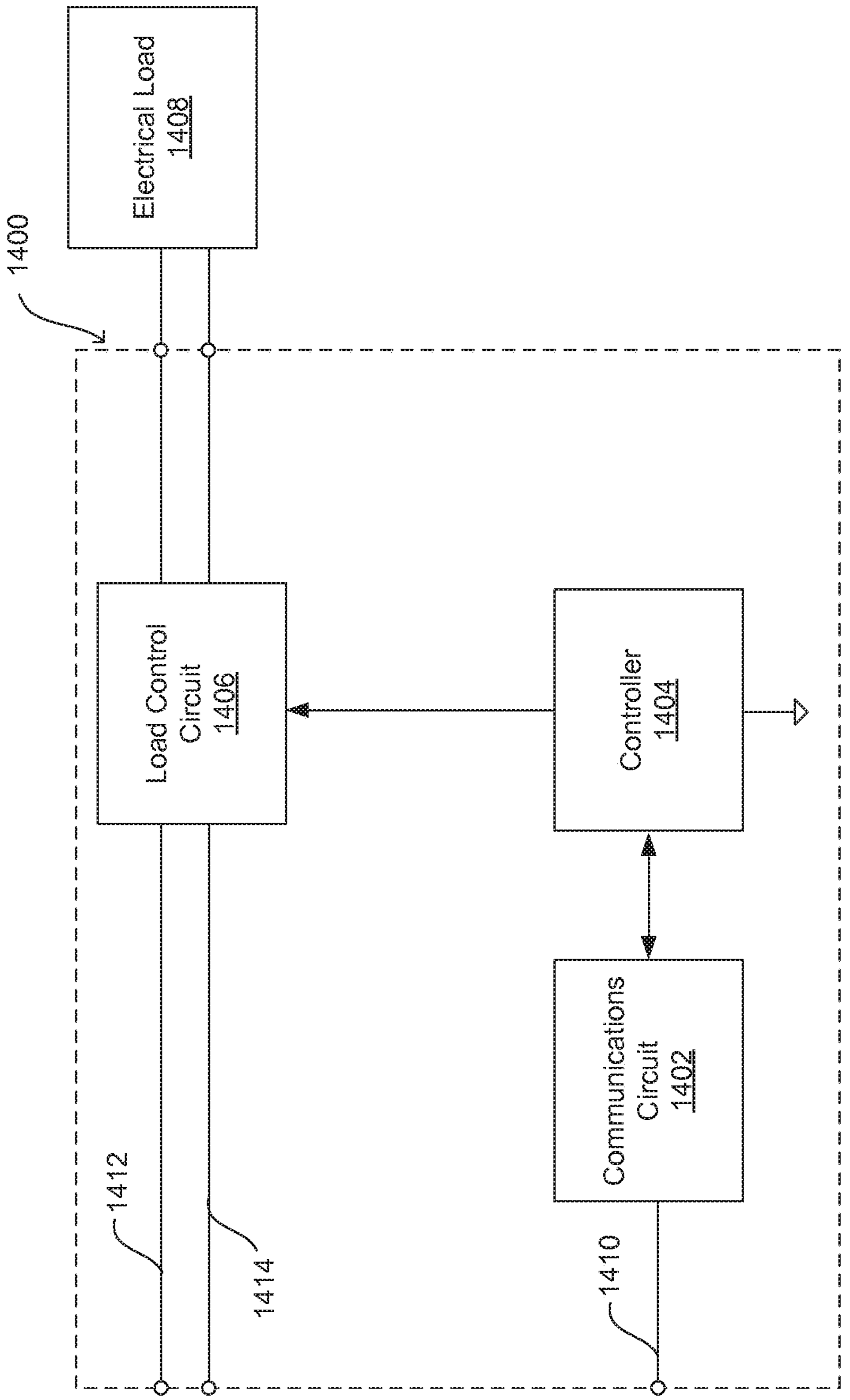
FIG. 14 is a block diagram depicting an example load control device.

FIG. 14 is a block diagram illustrating an example load control device 1400 as described herein. For example, the load control device 1400 may include a dimmer switch, an electronic switch, an electronic ballast for controlling fluorescent lamps, a light-emitting diode (LED) driver for controlling LED light sources, an AC plug-in load control device (e.g., a switching device), or other load control device. The load control device 1400 may include a communications circuit 1402. The communications circuit 1402 may include an RF transceiver or other communications module capable of performing wired and/or wireless communications via communications link 1410. The communications circuit 1402 may be in communication with the controller 1404. The controller 1404 may include one or more general purpose processors, special purpose processors, conventional processors, digital signal processors (DSPs), microprocessors, integrated circuits, a programmable logic device (PLD), application specific integrated circuits (ASICs), and/or the like. The controller 1404 may perform signal coding, data processing, power control, image processing, input/output processing, and/or any other functionality that enables the load control device to perform as described herein. The load control circuit 1406 may receive instructions or commands from the controller 1404 and may control the electrical load 1408 based on the received instructions or commands (e.g., by controlling the amount of power delivered to the load). The load control circuit 1406 may receive power via a hot connection 1412 and a neutral connection 1414. The electrical load 1408 may include any type of electrical load, as described herein, for example.

A load control device, as described herein for example, may include any device, or combination of devices, capable of controlling an electrical load, such as a lighting load, a motor for controlling a window shade, an HVAC system, a load from a device plugged into an AC plug-in load control device, or any other type of load, for example. The load control device may be capable of directly or indirectly controlling a load. For example, the load control device may include a ballast or an LED driver for directly controlling a lighting load. The load control device may include a remote control device, such as an occupancy sensor, a daylight sensor, a dimmer, a ballast control device, a wireless controller (e.g., a wireless phone, a tablet, etc.), or any other device capable of indirectly controlling a lighting load via a ballast or other direct load control device. While examples may be described herein using a lighting load or a ballast, any other type of electrical load or load control device may be implemented.

Although features and elements are described above in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. A system, comprising:

a plurality of electrical load control circuits, each of the plurality of electrical load control circuits including one or more indicator lamps and operatively coupled to at least one electrical load;

system control circuitry communicatively coupled, via a first network using a first network protocol, to each of the electrical load control devices included in the plurality of electrical load control device, the system control circuitry to:

assign, to each of the plurality of electrical load control circuits, a respective character sequence representative of a unique address associated with the respective electrical load control circuit;

responsive to receipt of a user input from a user device, via a second network using a second network protocol different from the first network, cause an electrical load control circuit included in the plurality of electrical load control circuits to communicate, via the one or more indicator lamps, the unique address associated with the respective electrical load control circuit to the user device;

receive, from the user device via the second network, data representative an electrical load identifier associated with the electrical load control circuit;

associate the received data representative an electrical load identifier with the unique address associated with the respective electrical load control circuit.

2. The system of claim 1:

wherein the one or more indicator lamps include one or more light-emitting diodes (LEDs); and wherein the system control circuitry causes the electrical load control circuit included in the plurality of electrical load control circuits to communicate, via visible light communication (VLC) using the one or more LEDs, the unique address associated with the respective electrical load control circuit to the user device.

3. The system of claim 2 wherein the electrical load includes one or more of the following: a thermostat, a keypad, an alternating-current (AC) plug-in load controller, and a window treatment.

4. The system of claim 3 wherein the electrical load control circuit causes the one or more LEDs to communicate using VLC by transitioning the one or more LEDs between an ON state and an OFF state.

5. The system of claim 1 wherein the electrical load includes a luminaire and the one or more indicator lamps include one or more lamps included in the luminaire.

6. The system of claim 5 wherein the system control circuitry causes the electrical load control circuit to communicate, via visible light communication (VLC) using the one or more lamps included in the luminaire.

7. The system of claim 6 wherein electrical load control circuit causes the one or more lamps included in the luminaire to communicate using VLC by altering the luminous output of the luminaire.

8. The system of claim 6 wherein the electrical load control circuit causes the one or more lamps included in the luminaire to communicate using VLC by transitioning the one or more lamps between an ON state and an OFF state.

9. The system of claim 1 wherein the second network includes a Bluetooth communication network.

10. A method to communicate configuration information received from an electrical load control circuit to a system control circuit via a user device, the method comprising:

assigning, by the system control circuit via a first network using a first network protocol, a character sequence representative of a respective unique address to each of a plurality of electrical load control circuits;

causing, by the system control circuit, an electrical load control circuit included in the plurality of electrical load control circuits to communicate, via one or more indicator lamps, the unique address associated with the respective electrical load control circuit to a user device responsive to receipt of a user input from the user device, via a second network using a second network protocol different from the first network;

receiving, by the system control circuit from the user device via the second network, data representative an electrical load identifier associated with the electrical load control circuit;

associating, by the system control circuit, the received data representative an electrical load identifier with the unique address associated with the respective electrical load control circuit; and storing, by the system control circuit in a communicatively coupled memory circuit, data representative of the association of the received data representative an electrical load identifier with the unique address associated with the respective electrical load control circuit.

11. The method of claim 10 wherein causing the electrical load control circuit included in the plurality of electrical load control circuits to communicate, via one or more indicator lamps, the unique address associated with the respective electrical load control further comprises:

causing the electrical load control circuit to communicate, via visible light communication (VLC) using one or more light-emitting diodes (LEDs), the unique address associated with the respective electrical load control circuit.

12. The method of claim 11 wherein causing the electrical load control circuit to communicate, via visible light communication (VLC) using the one or more LEDs, the unique address associated with the respective electrical load control circuit further comprises:

causing the electrical load control circuit in one or more of the following:

a thermostat, a keypad, an alternating-current (AC) plug-in load controller, and a window treatment to communicate, via visible light communication (VLC) using one or more LEDs, the unique address associated with the respective electrical load control circuit.

13. The method of claim 11 wherein causing the electrical load control circuit to communicate, via visible light communication (VLC) using the one or more LEDs, the unique address associated with the respective electrical load control circuit, further comprises:

causing the electrical load control circuit to communicate, via VLC using one or more LEDs, the unique address associated with the respective electrical load control circuit by transitioning the one or more LEDs between an ON state and an OFF state.

14. The method of claim 10 wherein causing the electrical load control circuit included in the plurality of electrical load control circuits to communicate, via one or more indicator lamps, the unique address associated with the respective electrical load control circuit, further comprises:

causing, by the system control circuit, the electrical load control circuit included in a luminaire to cause one or more lamps disposed in the luminaire to function as the one or more indicator lamps to communicate via visible light communication (VLC), the unique address associated with the respective electrical load control circuit.

15. The method of claim 14 wherein causing the electrical load control circuit included in the luminaire to cause the one or more lamps disposed in the luminaire to communicate via VLC, the unique address associated with the respective electrical load control circuit, further comprise:

causing the electrical load control circuit included in the luminaire to cause the one or more lamps disposed in the luminaire to communicate via VLC by altering the luminous output of the luminaire.

16. The method of claim 14 wherein causing the electrical load control circuit included in the luminaire to cause the one or more lamps disposed in the luminaire to communicate via VLC, the unique address associated with the respective electrical load control circuit, further comprise:

causing the electrical load control circuit included in the luminaire to cause the one or more lamps disposed in the luminaire to communicate via VLC by transitioning the one or more lamps between an ON state and an OFF state.

17. The method of claim 10 wherein causing the electrical load control circuit included in the plurality of electrical load control circuits to communicate, via the one or more indicator lamps, the unique address associated with the respective electrical load control circuit to the user device via the second network using the second network protocol different from the first network, further comprises:

causing, by the system control circuit, the electrical load control circuit included in the plurality of electrical load control circuits to communicate, via the one or more indicator lamps, the unique address associated with the respective electrical load control circuit to the user device via the second network using a Bluetooth communication network.

18. A non-transitory, machine-readable, storage device that includes instructions that, when executed by a system control circuit, cause the system control circuit:

assign, via a first network using a first network protocol, a character sequence representative of a respective unique address to each of a plurality of electrical load control circuits;

cause an electrical load control circuit included in the plurality of electrical load control circuits to communicate, via one or more indicator lamps, the unique address associated with the respective electrical load control circuit to a user device responsive to receipt of a user input from the user device, via a second network using a second network protocol different from the first network;

receive, from the user device via the second network, data representative an electrical load identifier associated with the electrical load control circuit;

associate the received data representative an electrical load identifier with the unique address associated with the respective electrical load control circuit; and store in a communicatively coupled memory circuit, data representative of the association of the received data representative an electrical load identifier with the unique address associated with the respective electrical load control circuit.

19. The non-transitory, machine-readable, storage device of claim 18 wherein the instructions that cause the system control circuit to cause the electrical load control circuit included in the plurality of electrical load control circuits to communicate, via one or more indicator lamps, the unique address associated with the respective electrical load control circuit further cause the system control circuit:

cause the electrical load control circuit to communicate, via visible light communication (VLC) using one or more light-emitting diodes (LEDs), the unique address associated with the respective electrical load control circuit.

20. The non-transitory, machine-readable, storage device of claim 19 wherein the instructions that cause the system control circuit to cause the electrical load control circuit to communicate, via visible light communication (VLC) using the one or more LEDs, the unique address associated with the respective electrical load control circuit further cause the system control circuit:

cause the electrical load control circuit in one or more of the following: a thermostat, a keypad, an alternating-current (AC) plug-in load controller, and a window treatment to communicate, via visible light communication (VLC) using one or more LEDs, the unique address associated with the respective electrical load control circuit.

21. The non-transitory, machine-readable, storage device of claim 19 wherein the instructions that cause the system control circuit to cause the electrical load control circuit to communicate, via visible light communication (VLC) using the one or more LEDs, the unique address associated with the respective electrical load control circuit, further cause the system control circuit to:

cause the electrical load control circuit to communicate, via VLC using one or more LEDs, the unique address associated with the respective electrical load control circuit by transitioning the one or more LEDs between an ON state and an OFF state.

22. The non-transitory, machine-readable, storage device of claim 18 wherein the instructions that cause the system control circuit to cause the electrical load control circuit included in the plurality of electrical load control circuits to communicate, via one or more indicator lamps, the unique address associated with the respective electrical load control circuit, further cause the system control circuit to:

cause the electrical load control circuit included in a luminaire to cause one or more lamps disposed in the luminaire to function as the one or more indicator lamps to communicate via visible light communication (VLC), the unique address associated with the respective electrical load control circuit.

23. The non-transitory, machine-readable, storage device of claim 22 wherein the instructions that cause the system control circuit to cause the electrical load control circuit included in the luminaire to cause the one or more lamps disposed in the luminaire to communicate via VLC, the unique address associated with the respective electrical load control circuit, further cause the system control circuit to:

cause the electrical load control circuit included in the luminaire to cause the one or more lamps disposed in the luminaire to communicate via VLC by altering the luminous output of the luminaire.

24. The non-transitory, machine-readable, storage device of claim 18 wherein the instructions that cause the system control circuit to cause the electrical load control circuit included in the luminaire to cause the one or more lamps disposed in the luminaire to communicate via VLC, the unique address associated with the respective electrical load control circuit, further cause the system control circuit to:

cause the electrical load control circuit included in the luminaire to cause the one or more lamps disposed in the luminaire to communicate via VLC by transitioning the one or more lamps between an ON state and an OFF state.

25. The non-transitory, machine-readable, storage device of claim 18 wherein the instructions that cause the system control circuit to cause the electrical load control circuit included in the plurality of electrical load control circuits to communicate, via the one or more indicator lamps, the unique address associated with the respective electrical load control circuit to the user device via the second network using the second network protocol different from the first network, further cause the system control circuit to:

cause the electrical load control circuit included in the plurality of electrical load control circuits to communicate, via the one or more indicator lamps, the unique address associated with the respective electrical load control circuit to the user device via the second network using a Bluetooth communication network.

* * * * *